United States Patent
Shamoto et al.

(10) Patent No.: US 10,300,539 B2
(45) Date of Patent: May 28, 2019

(54) ROTATING-CUTTING-EDGE-TYPE MILLING TOOL AND CUTTING METHOD USING SAME

(71) Applicants: National University Corporation Nagoya University, Nagoya-shi (JP); Mitsubishi Heavy Industries Aero Engines, Ltd., Komaki-shi (JP); MITSUBISHI MATERIALS CORPORATION, Tokyo (JP)

(72) Inventors: Eiji Shamoto, Nagoya (JP); Norikazu Suzuki, Nagoya (JP); Yu Hasegawa, Tokyo (JP); Nobukazu Horiike, Tokyo (JP); Yoichi Ishikawa, Tokyo (JP)

(73) Assignees: National University Corporation Nagoya University, Nagoya-shi (JP); Mitsubishi Heavy Industries Aero Engines, Ltd., Komaki-shi (JP); MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/319,171

(22) PCT Filed: May 1, 2015

(86) PCT No.: PCT/JP2015/063079
§ 371 (c)(1),
(2) Date: Dec. 15, 2016

(87) PCT Pub. No.: WO2015/194272
PCT Pub. Date: Dec. 23, 2015

(65) Prior Publication Data
US 2017/0113287 A1    Apr. 27, 2017

(30) Foreign Application Priority Data
Jun. 18, 2014   (JP) ................. 2014-125816

(51) Int. Cl.
B23C 5/10    (2006.01)
B23C 5/24    (2006.01)

(52) U.S. Cl.
CPC ............... *B23C 5/242* (2013.01); *B23C 5/10* (2013.01); *B23C 5/109* (2013.01);
(Continued)

(58) Field of Classification Search
CPC ........ B23C 2210/506; B23C 2210/163; B23C 2210/0435; B23C 2210/0428; B23C 2200/045; B23C 5/109
See application file for complete search history.

(56) References Cited

U.S. PATENT DOCUMENTS 2,885,766 A    5/1959    Ernst et al.
3,329,065 A    7/1967    Vaughn
(Continued)

FOREIGN PATENT DOCUMENTS

CN    101583455 A    11/2009
CN    102317018 A    1/2012
(Continued)

OTHER PUBLICATIONS

English translation of EP 2484471, Aug. 2012.*
(Continued)

*Primary Examiner* — Alan Snyder
(74) *Attorney, Agent, or Firm* — Locke Lord LLP

(57) ABSTRACT

A virtual plane obtained by a locus when a tangent line, which passes through a tool distal end edge, of a virtual circle formed when a tool distal end edge of a cutting edge is rotated in a tool circumferential direction is moved parallel to a tool axial line is a reference plane, an angle (ARt) at which a cross line of the reference plane and the cutting edge virtual plane, is inclined with respect to the tool axial line projected onto the reference plane, is in a range of (Continued)

−30 degrees to −60 degrees, an angle (RR) at which a cutting edge tangent line which passes through the tool distal end edge and extends outward in a tool radial direction, is inclined with respect to a predetermined tool radial direction, which passes through the tool distal end edge, is in a range of −30 degrees to −75 degrees.

9 Claims, 24 Drawing Sheets

(52) U.S. Cl.
CPC .. *B23C 2200/045* (2013.01); *B23C 2210/045* (2013.01); *B23C 2210/0435* (2013.01); *B23C 2210/0457* (2013.01); *B23C 2210/163* (2013.01); *B23C 2210/506* (2013.01)

(56) References Cited

U.S. PATENT DOCUMENTS

| | | |
|---|---|---|
| 5,658,100 A | 8/1997 | Deiss et al. |
| 2003/0219319 A1 | 11/2003 | Arvidsson |
| 2011/0013997 A1 | 1/2011 | Pokolm |
| 2013/0051941 A1 | 2/2013 | Ben Amor et al. |
| 2014/0030034 A1 | 1/2014 | Lehto et al. |

FOREIGN PATENT DOCUMENTS

| | | | |
|---|---|---|---|
| CN | 202845898 U | 4/2013 | |
| CN | 103118823 A | 5/2013 | |
| CN | 103769664 A | 5/2014 | |
| DE | 202005021474 U1 | 4/2008 | |
| EP | 0038923 A2 | 11/1981 | |
| EP | 1561532 A2 | 8/2005 | |
| EP | 2484471 A1 * | 8/2012 | ............... B23C 5/06 |
| EP | 2705917 A2 | 3/2014 | |
| FR | 1252422 A | 1/1961 | |
| JP | 56-163817 A | 12/1981 | |
| JP | 3264540 B2 | 3/2002 | |
| JP | 2011-515231 A | 5/2011 | |
| JP | 2012-206243 A | 10/2012 | |
| JP | 2013-144356 A | 7/2013 | |
| SE | 1251004 A1 | 3/2014 | |
| WO | WO 2012144240 A1 * | 10/2012 | ............. B23C 5/109 |

OTHER PUBLICATIONS

Officer Action dated Jan. 26, 2018, issued for the Chinese patent application 201580031995.0 and a partial English translation of the Search Report.
Search Report dated Dec. 14, 2017, issued for the European patent application No. 15810491.9.
International Search Report dated Aug. 4, 2015, issued for PCT/JP2015/063079 and English translation thereof.
Search Report dated Apr. 11, 2018, issued for the European patent application No. 15810491.9.

* cited by examiner

US 10,300,539 B2

ROTATING-CUTTING-EDGE-TYPE MILLING TOOL AND CUTTING METHOD USING SAME

TECHNICAL FIELD

The present invention relates to a rotating-cutting-edge-type milling tool in which a discoid cutting insert is rotatably mounted around an insert axial line thereof on an insert attachment seat which is formed at an outer periphery portion of a distal end of a tool main body rotated around a tool axial line and a cutting method in which a work material is cut using the rotating-cutting-edge-type milling tool.

Priority is claimed on Japanese Patent Application No. 2014-125816, filed Jun. 18, 2014, the content of which is incorporated herein by reference.

BACKGROUND ART

In the related art, a device in which a discoid cutting insert, which includes a cutting edge at an outer periphery edge is rotatably around an insert axial line thereof, is mounted on an insert attachment seat which is formed at an outer periphery portion of a distal end of a tool main body, which is rotated around a tool axial line, which is shown in for example, Patent Document 1 or 2, is known as a rotating-cutting-edge-type milling tool (a rotary milling tool) used for a milling process (a tool rotating cutting process) using a hard-to-cut material or the like such as a heat resistant alloy as a work material.

In the rotating-cutting-edge-type milling tool, among front and rear surfaces which face both sides of the cutting insert in the insert axial line direction, the front surface is located to face forward in a tool rotation direction around the tool axial line and is set to a rake face and the rear surface is located to face rearward in the tool rotation direction and sits on the insert attachment seat.

Also, at a time of cutting, the cutting insert is rotated around the insert axial line in a driven manner with respect to the insert attachment seat using force received by the cutting edge (which is cutting force or cutting resistance and includes cutting edge force or a component of edge force) when the cutting insert cuts into a work material. Thus, only a predetermined portion of the cutting edge is suppressed from being continuously used for cutting, and a decrease in partial sharpness of the cutting edge, cutting edge loss, and the like are prevented.

CITATION LIST

Patent Literature

[Patent Document 1]
 Japanese Patent No. 3264540
[Patent Document 2]
 Published Japanese Translation No. 2011-515231 of the PCT International Publication

SUMMARY OF INVENTION

Technical Problem

However, the above-described rotating-cutting-edge-type milling tool has problems as will be described below.

In the rotating-cutting-edge-type milling tool of Patent Document 1 or 2, there is a concern that deformation, wear, damage, and the like of a rotating shaft or the like (a shaft portion 32 and balls 8 of Patent Document 1 or a bearing pin 9 of Patent Document 2) of the cutting insert are generated due to force received by the cutting edge of the cutting insert which is mounted on the insert attachment seat when the cutting edge of the cutting insert cuts into the work material. Particularly, such problems easily occur in a heavy cutting operation and the like of a hard-to-cut material.

In this type of rotating-cutting-edge-type milling tool, there is room for improvement in stably rotating the cutting insert mounted on the insert attachment seat around the insert axial line in the driven manner.

The present invention was made in view of the above-described circumstances, and an object of the present invention is to provide a rotating-cutting-edge-type milling tool in which deformation, wear, damage, and the like of a rotary support body such as the rotating shaft of the cutting insert can be prevented, the cutting insert which is mounted on the insert attachment seat can be stably rotated around the insert axial line in the driven manner, and thus processing accuracy of cutting can be stably increased and a tool life can be increased and a cutting method using the rotating-cutting-edge-type milling tool.

Solution to Problem

In order to solve such problems and accomplish the above-described object, the present invention proposes the following means.

An aspect of the present invention relates to a rotating-cutting-edge-type milling tool comprising: a tool main body which is rotated around a tool axial line; an insert attachment seat formed at an outer periphery portion of a distal end of the tool main body; and a cutting insert formed a discoid shape is rotatably around an insert axial line thereof, mounted on the insert attachment seat, the cutting insert including: front and rear surfaces which intersect the insert axial line; an outer periphery surface which connects circumferential edges of the front and rear surfaces; and a cutting edge formed a circular shape extending around the insert axial line, which is formed a circumferential edge of the front surface, wherein among the front and rear surfaces, the front surface is located to face forward in a tool rotation direction around the tool axial line, and the rear surface is located to face rearward in the tool rotation direction and sits on the insert attachment seat, a circle obtained by a locus when a tool distal end edge in the tool axial line direction on the cutting edge, is rotated a tool circumferential direction of around the tool axial line, is a virtual circle, a virtual plane obtained by a locus when a tangent line of the virtual circle which passes through the tool distal end edge, is moved parallel to the tool axial line toward a tool posterior end from the tool distal end edge, is a reference plane, an angle (ARt) at which a cross line of the reference plane and a cutting edge virtual plane including the cutting edge, is inclined with respect to the tool axial line projected onto the reference plane, is in a range of −30 degrees to −60 degrees, and an angle (RR) at which a cutting edge tangent line of the cutting edge which passes through the tool distal end edge and extends outward in a tool radial direction which is orthogonal to the tool axial line, is inclined with respect to a predetermined tool radial direction among the tool radial directions which passes through the tool distal end edge, is in a range of −30 degrees to −75 degrees.

An aspect of the present invention relates to a rotating-cutting-edge-type milling tool comprising: a tool main body which is rotated around a tool axial line; an insert attachment seat formed at an outer periphery portion of a distal end of the tool main body; and a cutting insert formed a discoid shape is rotatably around an insert axial line thereof, mounted on the insert attachment seat, the cutting insert including: front and rear surfaces which intersect the insert axial line; an outer periphery surface which connects circumferential edges of the front and rear surfaces; and a cutting edge formed a circular shape extending around the insert axial line, which is formed a circumferential edge of the front surface, wherein among the front and rear surfaces, the front surface is located to face forward in a tool rotation direction around the tool axial line, and the rear surface is located to face rearward in the tool rotation direction and sits on the insert attachment seat, a circle obtained by a locus when a tool distal end edge in the tool axial line direction on the cutting edge, is rotated a tool circumferential direction of around the tool axial line, is a virtual circle, a virtual plane obtained by a locus when a tangent line of the virtual circle which passes through the tool distal end edge, is moved parallel to the tool axial line toward a tool posterior end from the tool distal end edge, is a reference plane, an angle (ARt) at which a cross line of the reference plane and a cutting edge virtual plane including the cutting edge, is inclined with respect to the tool axial line projected onto the reference plane, is in a range of −30 degrees to −60 degrees, and an angle (RR) at which a cutting edge tangent line of the cutting edge which passes through the tool distal end edge and extends outward in a tool radial direction which is orthogonal to the tool axial line, is inclined with respect to a predetermined tool radial direction among the tool radial directions which passes through the tool distal end edge, is in a range of −20 degrees to 30 degrees.

An aspect of the present invention relates to a cutting method of cutting a work material using a rotating-cutting-edge-type milling tool in which comprising, a tool main body which is rotated around a tool axial line; an insert attachment seat formed at an outer periphery portion of a distal end of the tool main body; and a cutting insert formed a discoid shape is rotatably around an insert axial line thereof, mounted on the insert attachment seat, the cutting insert including: front and rear surfaces which intersect the insert axial line; an outer periphery surface which connects circumferential edges of the front and rear surfaces; and a cutting edge formed a circular shape extending around the insert axial line, which is formed a circumferential edge of the front surface, wherein among the front and rear surfaces, the front surface is located to face forward in a tool rotation direction around the tool axial line, and the rear surface is located to face rearward in the tool rotation direction and sits on the insert attachment seat, when it is assumed that, a point of intersection of a predetermined insert radial direction among insert radial directions which are orthogonal to the insert axial line, passing through a point of action of a concentrated load when force, which acts on the cutting insert from the work material in a distributed manner at a time of a cutting operation, is regarded as a concentrated load and the cutting edge, is a representative cutting point, a direction which is directed in a line of intersection of a first virtual plane which is perpendicular to a tangent line of the cutting edge passing through the representative cutting point and a second virtual plane which includes the tangent line and a virtual straight line in an instantaneous cutting direction at the representative cutting point, in which the direction is directed rearward in the tool rotation direction, is a principal force direction, among force which acts on the cutting insert from the work material at the time of the cutting operation, a component of force at the representative cutting point in the principal force direction is a principal force, and a component of force which is perpendicular to the principal force direction and is directed in a back force direction, which is directed inward in the insert radial direction, is a back force, and an angle at which the insert axial line is inclined with respect to a direction of a resultant force of the principal force and the back force on a surface of the first virtual plane is set in a range of ±20 degrees.

According to the cutting method using the rotating-cutting-edge-type milling tool related to the present invention, since the direction of the insert axial line of the cutting insert which is mounted on the insert attachment seat of the tool main body is set in parallel with the direction of the resultant force (a resultant cutting force) of the principal force and the back force among force received by the cutting edge of the cutting insert (which is cutting force or cutting resistance and includes cutting edge force or a component of edge force) when the cutting edge of the cutting insert cuts into the work material in the first virtual plane which is perpendicular to the tangent line of the cutting edge which passes through the representative cutting point. Therefore, a rotating shaft which is located on the insert axial line of the cutting insert or a rotary support body such as a radial bearing which supports rotatably the cutting insert from the outside in the insert radial direction is sufficiently suppressed from being pressed by the resultant force in the insert radial direction (that is, in a shear direction of the rotary support body such as a rotating shaft), and the resultant force can be efficiently released to the insert attachment seat via the rear surface of the cutting insert. Thus, deformation, wear, damage, occurrence of excessive friction torque, and the like of the rotary support body such as the rotating shaft of the cutting insert are prevented. Note that the expression "occurrence of excessive friction torque is prevented" means preventing a phenomenon in which friction torque is too large and thus the cutting insert is not easily rotated, for example, when the cutting insert is rotatably supported by the rotary support body such as the radial bearing from the outside in the insert radial direction.

In other words, an inclination of the insert axial line is determined in advance so as to be in parallel with the direction of the resultant force acting on the representative cutting point on the cutting edge, which is determined in accordance with a desired cutting operation (a predetermined cutting condition or the like) using the rotating-cutting-edge-type milling tool, from the work material at the time of the cutting operation so that a load of the cutting insert with respect to the rotary support body can be stably and significantly reduced.

The "representative cutting point" described in this specification will be described.

The force received by the cutting insert when the cutting edge of the cutting insert mounted on the tool main body cuts into the work material at the time of the cutting operation is a distributed load which is distributed to an entire contact area including chips which are discharged and with which the cutting insert comes into contact, but when the distributed load is regarded (assumed) as a concentrated load on the basis of the force and a moment (a moment viewed from an insert center) received by the cutting insert due to such a distributed load, a point of intersection of a predetermined insert radial direction which passes through a point of action of the concentrated load (a point corresponding to a center of gravity of the distributed load) and the cutting edge is referred to as the "representative cutting point" described in this specification. To be specific, in FIG. 12, a point of intersection 5c of a predetermined insert radial direction ID passing through the point of action P of the concentrated load when the distributed load which acts on the cutting insert 3 from the work material at the time of the cutting operation is regarded as the concentrated load and the cutting edge 5 forming a circular shape is the representative cutting point. Also, the representative cutting point can be said to be a point on the cutting edge, which is closest to a point of average action of the cutting force at the time of the cutting operation. The representative cutting point is located on the cutting edge of the cutting insert. However, even when the cutting insert is rotated around the insert axial line in the driven manner, the representative cutting point is not rotated together with the cutting insert, and a relative position thereof with respect to the tool is not changed. Note that, since the point of action of the force is changed, for example, when a depth of cut in the tool axial line direction is changed, the representative cutting point is moved with it.

Also, the "instantaneous cutting direction at the representative cutting point" is a direction of a relative instantaneous speed in the representative cutting point between the tool and the work material and is mainly rotated along with rotation of the tool.

The expression "extending direction of the insert axial line is set parallel or to have a predetermined minute angle (that is, set to be parallel) with respect to the direction of the resultant force of the principal force and the back force on the surface of the first virtual plane" specifically means that an angle at which the insert axial line is inclined with respect to the direction of the resultant force is in a range of ±20 degrees on the surface of the first virtual plane (when viewed in the direction of the tangent line of the cutting edge passing through the representative cutting point) in a range of a cutting condition which can be assumed using the rotating-cutting-edge-type milling tool. In other words, the angle formed by two straight lines such as the insert axial line and the direction of the resultant force is in the range of ±20 degrees, which indicates the expression "set parallel or to have the predetermined minute angle." Note that the angle is preferably ±10 degrees and the angle is more preferably ±5 degrees. When the angle is 0 degree, the insert axial line is parallel (set parallel) to the direction of the resultant force.

Note that the above-described angle at which the insert axial line is inclined with respect to the direction of the resultant force is in the range of ±20 degrees means that the angle formed by the direction of the resultant force and the insert axial line is 20 degrees or less. Also, the above-described angle at which the insert axial line is inclined with respect to the direction of the resultant force is in a range of ±10 degrees means that the angle formed by the direction of the resultant force and the insert axial line is 10 degrees or less. The above-described angle at which the insert axial line is inclined with respect to the direction of the resultant force is in a range of ±5 degrees means that the angle formed by the direction of the resultant force and the insert axial line is 5 degrees or less.

The extending direction of the insert axial line with respect to the direction of the resultant force is not limited to only "parallel" and is set to have a slight angular range for the following reasons.

It is considered that the direction of the resultant force is changed by, for example, a shape of the rake face of the cutting insert, a cutting edge process and a wear state of the cutting edge, a coefficient of friction of the work material, a cutting condition (the depths of cut, the feed, or the like), or the like. For this reason, since it is not easy to accurately set the extending direction of the insert axial line parallel to the direction of the resultant force, the expression "set parallel or to have the predetermined minute angle" is used as a range in which an effect of the present invention can be sufficiently acquired.

Since the rotary support body such as the rotating shaft of the cutting insert is not easily pressed in the insert radial direction as described above, the cutting insert is stably and easily rotated around the insert axial line in the driven manner with respect to the insert attachment seat by the force received by the cutting edge when the cutting insert cuts into the work material.

Note that, the feed force (a component of force which is directed in the direction of the tangent line passing through the representative cutting point of the cutting edge and the component of force which passes through the representative cutting point and is directed in the direction which is orthogonal to the first virtual plane) other than the principal force and the back force in the force received by the cutting edge when the cutting edge cuts into the work material, since the feed force, which plays a role in causing the cutting insert to be rotated in the driven manner by roughly cancelling out the frictional force between the feed force and a rotating mechanism such as the thrust sliding bearing member and force presses the rotary support body such as the rotating shaft of the cutting insert, is sufficiently smaller than force other than the feed force, the force can be roughly neglected as force which presses the rotary support body of the cutting insert in the insert radial direction, that is, a strong pressing force does not act on the rotary support body of the cutting insert by the feed force. Thus, the insert axial line extends in parallel with the direction of the resultant force on the surface of the first virtual plane so that the above-described effects can be stably acquired.

Since the extending direction of the insert axial line of the cutting insert and the direction of the resultant force are substantially parallel to each other as described above, the insert axial line specifically extends to be gradually inclined (that is, inclined forward) toward a tool distal end in the tool axial line direction as it goes forward in the tool rotation direction or/and extends to be gradually inclined outward in the tool radial direction as it goes forward in the tool rotation direction. Thus, a space in which a rotating mechanism such as the thrust sliding bearing member configured to rotate the cutting insert in the driven manner is arranged in the insert attachment seat can be easily secured. To be specific, the insert axial line extends to be inclined as described above so that, even if an interval between the adjacent insert attachment seats around the tool axial line tends to be narrow, in particular, in the multi-blade rotating-cutting-edge-type milling tool, in which a plurality of cutting inserts are mounted, the space in which the rotating mechanism is arranged can be easily secured.

Also, according to the rotating-cutting-edge-type milling tool related to the present invention, since the angle (Art) is in a range of −30 degrees to −60 degrees and the angle (RR) is in a range of −30 degrees to −75 degrees, the cutting insert is stably and easily rotated around the insert axial line in the driven manner with respect to the insert attachment seat by the force received by the cutting edge when the cutting insert cuts into the work material, and the above-described effects are significantly attained.

The angle ARt described in the present specification is the axial rake angle in which the instantaneous cutting direction at the tool distal end edge of the cutting edge used for cutting is considered. If the angle ARt is −(minus), the angle ARt is a negative axial rake angle, and if the angle ARt is +(plus), the angle ARt is a positive axial rake angle when viewed in the longitudinal cross section on the reference plane SS shown in FIG. 6. To be specific, in FIG. 6, when the angle ARt is −, the cross line CL gradually extends forward in the tool rotation direction T as it goes toward the tool posterior end from the tool distal end edge 5a. Also, although not particularly shown, when the angle ARt is +, the cross line CL gradually extends rearward in the tool rotation direction T as it goes toward the tool posterior end from the tool distal end edge 5a. Note that, since the angle ARt is an angle in which a shape of the rake face, which is adjacent to the cutting edge of the cutting insert, is not considered, the angle can be said to be the apparent axial rake angle. In FIG. 6, the tool axial line O coincides with a reference surface in which the angle ARt (the axial rake angle)=0 degree. Note that the reference surface is a virtual plane which is perpendicular to the instantaneous cutting direction in the tool distal end edge 5a of the cutting edge 5.

The angle RR is the radial rake angle at the tool distal end edge of the cutting edge used for the cutting. As shown in FIGS. 1 and 20, in a front view when the rotating-cutting-edge-type milling tool 1 or 31 is viewed toward the posterior end from the distal end in the tool axial line O direction, when the angle RR is −(minus), the angle RR is a negative radial rake angle, and when the angle RR is +(plus), the angle RR is a positive radial rake angle. To be specific, in FIG. 1, when the angle RR is −, the cutting edge tangent line L2 gradually extends rearward in the tool rotation direction T as it goes outward in the tool radial direction from the tool distal end edge 5a. In FIG. 20, when the angle RR is +, the cutting edge tangent line L2 gradually extends forward in the tool rotation direction T as it goes outward in the tool radial direction from the tool distal end edge 5a. In FIGS. 1 and 20, the predetermined tool radial direction D coincides with the reference surface in which the angle RR (the radial rake angle)=0 degree.

The cutting insert is mounted on the insert attachment seat such that the angle ARt is in the range of the above-described range and the angle RR is in the above-described range so that an effect in which the cutting insert is stably rotated in the driven manner, wear and the like of the rake face are significantly suppressed, and thus a tool life is further increased can be expected.

To be specific, when the angle ARt is out of the above-described range (is greater than −30 degrees or smaller than −60 degrees), there is a concern that it is difficult to maintain the direction of the insert axial line and the direction of the resultant force to be parallel to each other on the surface of the first virtual plane and a load (a pressing force in the insert radial direction) of the cutting insert on the rotating shaft (the rotary support body) by the resultant force is not easily suppressed, and thus the above-described effects cannot be stably and easily attained.

Also, when the angle RR is out of the above-described range, to be specific, when the angle RR is greater than −30 degrees (and is smaller than −20 degrees), there is a concern that an effect in which the cutting insert can be stably rotated in the driven manner due to a combination of the angle RR and the angle ARt is not easily acquired. When the angle RR is smaller than −75 degrees, there is a concern that a cutting force at the time of the cutting operation is increased and chatter vibration is easily generated.

According to the rotating-cutting-edge-type milling tool related to the present invention, since the angle ARt is in a range of −30 degrees to −60 degrees and the angle RR is in a range of −20 degrees to 30 degrees, the cutting insert is more stably and easily rotated around the insert axial line in the driven manner with respect to the insert attachment seat by the force received by the cutting edge when the cutting insert cuts into the work material, the above-described effects are more significantly attained.

The cutting insert is mounted on the insert attachment seat such that angle ARt is in the range of the above-described range and the angle RR is in the above-described range so that an effect in which the cutting insert is stably and easily rotated in the driven manner, wear and the like of the rake face are significantly suppressed, and thus a tool life is further increased can be expected.

To be specific, when the angle ARt is out of the above-described range (is greater than −30 degrees or smaller than −60 degrees), there is a concern that it is difficult to maintain the direction of the insert axial line and the direction of the resultant force to be parallel to each other on the surface of the first virtual plane and a load (a pressing force in the insert radial direction) of the cutting insert on the rotating shaft (the rotary support body) by the resultant force is not easily suppressed, and thus the above-described effects cannot be stably and easily attained.

Also, when the angle RR is smaller than −20 degrees (and is greater than −30 degrees), there is a concern that an effect in which the cutting insert is stably rotated in the driven manner due to a combination of the angle RR and the angle ARt is not easily acquired. When the angle RR is greater than 30 degrees, there is a concern that chatter vibration is easily generated or an outer periphery surface (a flank face) of the cutting insert interferes with the work material at the time of the cutting operation, and thus an amount of movement (that is, the feed per revolution fz) of the tool main body per unit rotation around the tool axial line in the tool radial direction is not easily secured. Note that, when the clearance angle of the outer periphery surface of the cutting insert is increased for the purpose of securing the feed per revolution fz, there is a concern that it is difficult to sufficiently secure a wedge angle of the cutting edge, and cutting edge loss and the like are thus generated.

As described above, according to the present invention, deformation, wear, damage, and the like of the rotary support body such as the rotating shaft of the cutting insert can be prevented, and the cutting insert which is mounted on the insert attachment seat can be stably rotated in the driven manner around the insert axial line. Thus, processing accuracy of the cutting is stably increased, and the tool life can thus be increased.

In the rotating-cutting-edge-type milling tool, a portion on the front surface of the cutting insert, which is close to an inside of the cutting edge in an insert radial direction which is orthogonal to the insert axial line, may be formed with a rake face formed a tapered shape which is gradually inclined toward the rear surface from the front surface in the insert axial line direction as it goes inward in the insert radial direction from the cutting edge.

As described above, for example, when the insert axial line extends to be gradually inclined toward the tool distal end in the tool axial line direction as it goes forward in the tool rotation direction, the cutting insert is mounted on the insert attachment seat in a mounting attitude in which an apparent axial rake angle (an angle AR) is negative. However, according to the above-described constitution of the present invention, a substantially axial rake angle is set to be larger in a positive side than the apparent axial rake angle, and the sharpness of the cutting edge is stably increased.

When the insert axial line extends to be gradually inclined outward in the tool radial direction as it goes forward in the tool rotation direction, the cutting insert is mounted on the insert attachment seat in a mounting attitude in which an apparent radial rake angle (an angle RR) is negative. However, according to the above-described constitution of the present invention, a substantially radial rake angle is set to be larger in a positive side than the apparent radial rake angle, and the sharpness of the cutting edge is stably increased.

Even when the insert axial line extends to be gradually inclined toward the tool distal end in the tool axial line direction and outward in the tool radial direction as it goes forward in the tool rotation direction, the same effects as described above are acquired.

In the rotating-cutting-edge-type milling tool, the outer periphery surface of the cutting insert may be formed with a flank face formed a tapered shape which is gradually inclined outward in an insert radial direction which is orthogonal to the insert axial line as it goes toward the rear surface from the front surface in the insert axial line direction from the cutting edge.

In this case, even when the cutting insert is mounted on the insert attachment seat in the above-described mounting attitude, the wedge angle of the cutting edge can be significantly secured, and cutting edge loss and the like can be prevented.

In the rotating-cutting-edge-type milling tool, the cutting insert may be formed with a through hole which extends on the insert axial line and is open to the front and rear surfaces, a rotating shaft is provided at the insert attachment seat, the rotating shaft including: a shaft portion, a diameter of which is smaller than that of the through hole, which is inserted through in the through hole, and which is attached to the insert attachment seat; and a head portion, a diameter of which is larger than that of the through hole and which has a gap between the head portion and the front surface, wherein a position of the rotating shaft with respect to the insert attachment seat in the insert axial line direction is able to be adjusted, and a restricting portion which is able to restrict movement of the rotating shaft with respect to the insert attachment seat in the insert axial line direction is provided.

In this case, the cutting insert is rotated with respect to the insert attachment seat in the driven manner while being supported by the shaft portion of the rotating shaft (the rotary support body), which is inserted through in the through hole, from an inside in the insert radial direction, and is retained by the head portion of the rotating shaft. Also, the position of the rotating shaft with respect to the insert attachment seat in the insert axial line direction is adjusted so that a gap (a clearance) between the head portion of the rotating shaft and the front surface of the cutting insert can be set to a desired value, and the movement of the rotating shaft with respect to the insert attachment seat in the insert axial line direction can be restricted by the restricting portion after the adjustment.

That is, according to this constitution, for example, when the rotating mechanism such as the thrust sliding bearing member by which the cutting insert can be rotated on the insert attachment seat in the driven manner is provided, the rotating shaft can be fixed after a position is minutely adjusted by advancing or retreating the rotating shaft in the insert axial line direction in accordance with a wear (wear and loss) state of the rotating mechanism, and thus the rotation of the cutting insert in the driven manner with respect to the insert attachment seat is more stably maintained.

In the rotating-cutting-edge-type milling tool, the insert attachment seat may include an attachment surface having an axisymmetric geometry centering on the insert axial line.

In this case, since the attachment surface of the insert attachment seat has the axisymmetric geometry having the insert axial line as a center (a central axial line), the attachment surface is specifically set to, for example, a circular planar shape which is perpendicular to the insert axial line, a conical surface shape having the insert axial line as a central axial line, a spherical shape, or a combined shape of the shapes. Therefore, the entire attachment surface of the insert attachment seat can receive the resultant force, which is transferred to the insert attachment seat from the cutting insert, in a distributed manner, and local wear and the like on the attachment surface is prevented. Thus, the above-described effects are stably acquired over a long period of time.

Advantageous Effects of Invention

According to a rotating-cutting-edge-type milling tool and a cutting method of the present invention, deformation, wear, damage, and the like of a rotary support body such as a rotating shaft of a cutting insert can be prevented, the cutting insert which is mounted on an insert attachment seat can be stably rotated around an insert axial line in a driven manner, and thus processing accuracy of cutting can be stably increased and a tool life can be increased.

DESCRIPTION OF EMBODIMENTS (First Embodiment)

Figure 1:
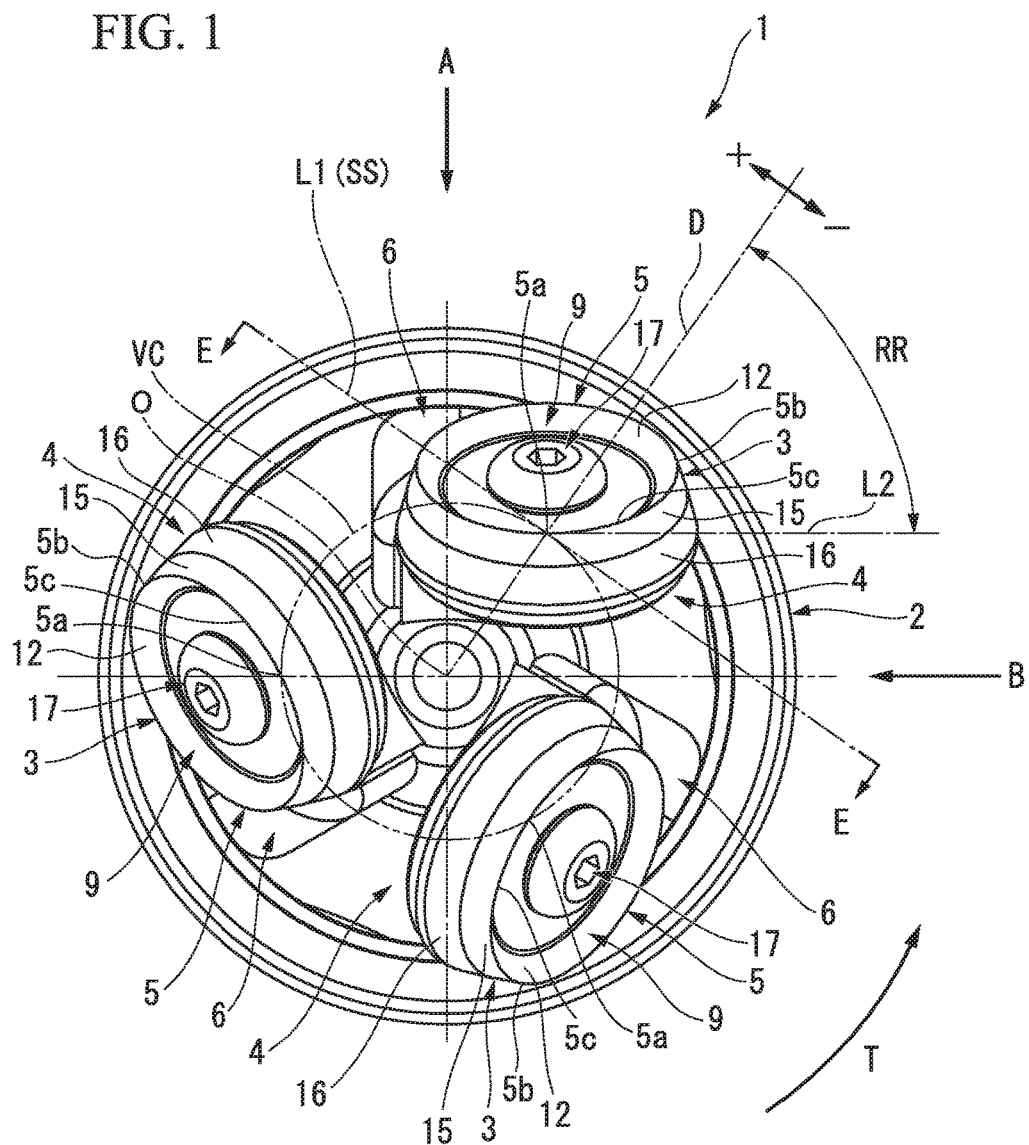
FIG. 1 is a front view showing a rotating-cutting-edge-type milling tool related to a first embodiment of the present invention (a view when a tip surface of the rotating-cutting-edge-type milling tool in a tool axial line direction is viewed from the front).
Figure 2:
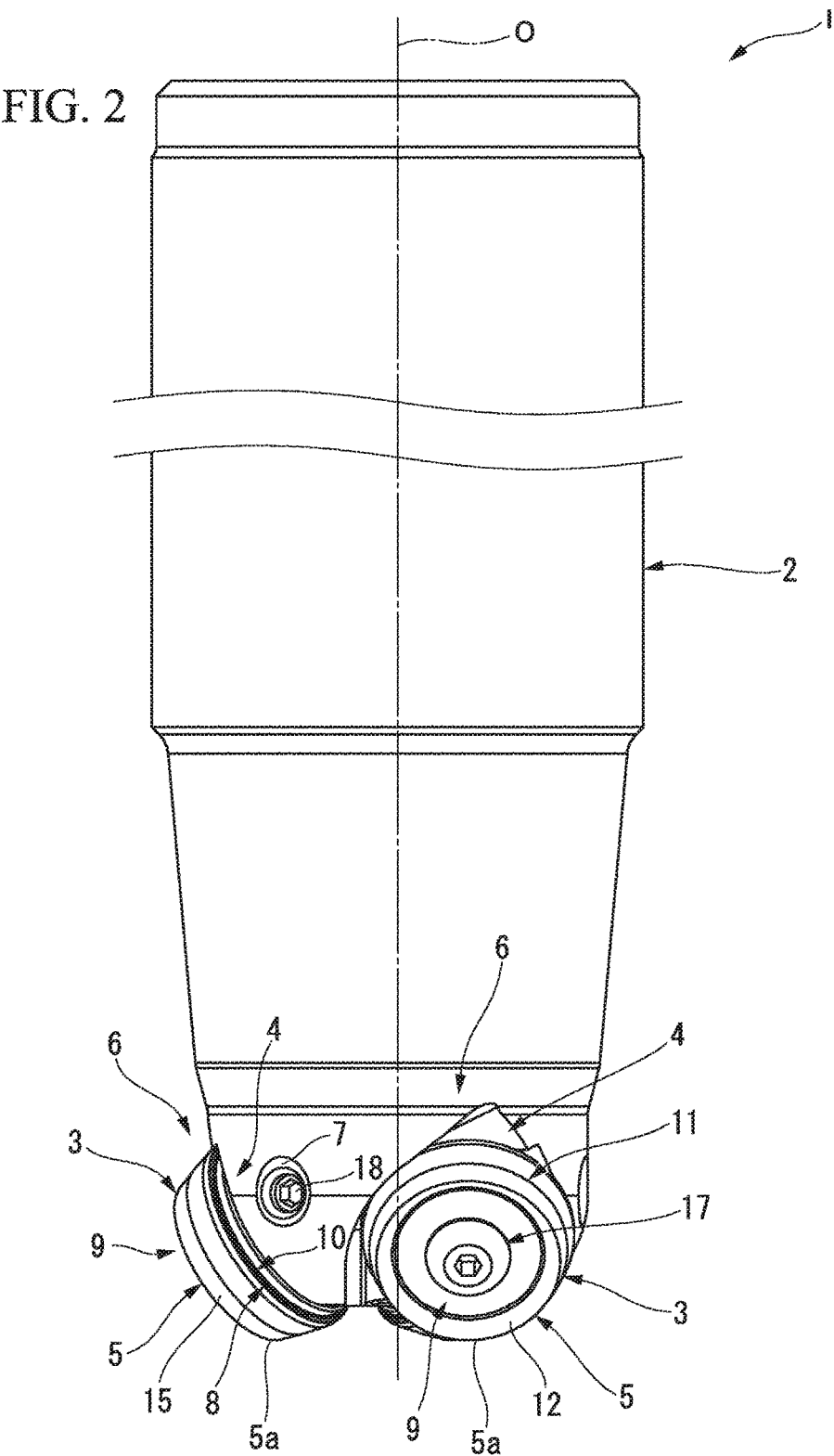
FIG. 2 is a side view showing an arrow A view of the rotating-cutting-edge-type milling tool of FIG. 1.

Hereinafter, a rotating-cutting-edge-type milling tool 1 and a cutting method using the rotating-cutting-edge-type milling tool 1 related to a first embodiment of the present invention will be described with reference to the drawings.

As shown in FIGS. 1 to 8, the rotating-cutting-edge-type milling tool 1 of this embodiment includes a tool main body 2 which is formed of steel or the like and cutting inserts 3 which are formed of a hard material such as cemented carbide, and the discoid cutting inserts 3 are rotatably set and removably mounted around an insert axial line C thereof on insert attachment seats 4 which are formed at an outer periphery portion of a distal end of the tool main body 2 rotating around a tool axial line O. Each of the cutting inserts 3 is a so-called round insert having a circular cutting edge 5, and the cutting edge 5 protrudes toward a distal end direction and outward in a radial direction of the tool main body 2 while the cutting insert 3 is mounted on each of the insert attachment seats 4.

In the rotating-cutting-edge-type milling tool 1, a posterior end of the tool main body 2 is attached to a main shaft of a machine tool (not shown), is rotated in a tool rotation direction T of around the tool axial line O, and is used for a cutting operation (in particular, a heavy cutting operation) of a work material such as a hard-to-cut material such as a heat resistant alloy. The rotating-cutting-edge-type milling tool 1 is a rotary milling tool in which the cutting insert 3 is rotated around the insert axial line C in a driven (passive) manner with respect to the insert attachment seat 4 by force received by the cutting edge 5 (which is cutting force or cutting resistance and includes cutting edge force or a component of edge force) when the cutting insert 3 cuts into the work material.

In this specification, the insert attachment seat 4 side of the tool main body 2 in a tool axial line O direction is referred to as a direction toward a tool distal end or simply a distal end direction (a lower side of FIGS. 2 to 6), and an opposite side (a main shaft side of the machine tool) to the insert attachment seat 4 in the tool axial line O direction is referred to as a direction toward a tool posterior end or simply a posterior end direction (an upper side of FIGS. 2 to 6). Also, a direction which is perpendicular to the tool axial line O is referred to as a tool radial direction, and a direction around the tool axial line O is referred to as a tool circumferential direction. In the tool circumferential direction, a direction in which the tool main body 2 is rotated at a time of cutting is referred to as the tool rotation direction T or the forward in the tool rotation direction T, and a direction toward an opposite side to the tool rotation direction T (the forward thereof) is referred to as the rearward in the tool rotation direction T. Also, a direction which is perpendicular to the insert axial line C of the cutting insert 3 is referred to as an insert radial direction, and a direction around the insert axial line C is referred to as the insert circumferential direction.

The tool main body 2 has a cylindrical shape or a disk shape and can be rotated around the tool axial line O serving as a central axial line thereof. In the illustrated example, the tool main body 2 has the cylindrical shape, and is formed to have a portion (a shank portion) other than a distal end portion (a blade portion) in the tool main body 2, a diameter of which is greater than that of the distal end portion. In this embodiment, a diameter of the distal end portion of the tool main body 2 is gradually reduced toward the tool distal end, and the distal end portion thereof has a tapered shape.

The distal end outer periphery portion of the tool main body 2 is formed with a plurality of chip pockets 6 to be cut in a concave shape from the distal end outer periphery portion at intervals in the tool circumferential direction. A wall surface of each of the chip pockets 6, which faces the tool rotation direction T, is formed with the insert attachment seat 4 on which the cutting insert 3 is removably mounted.

Figure 6:
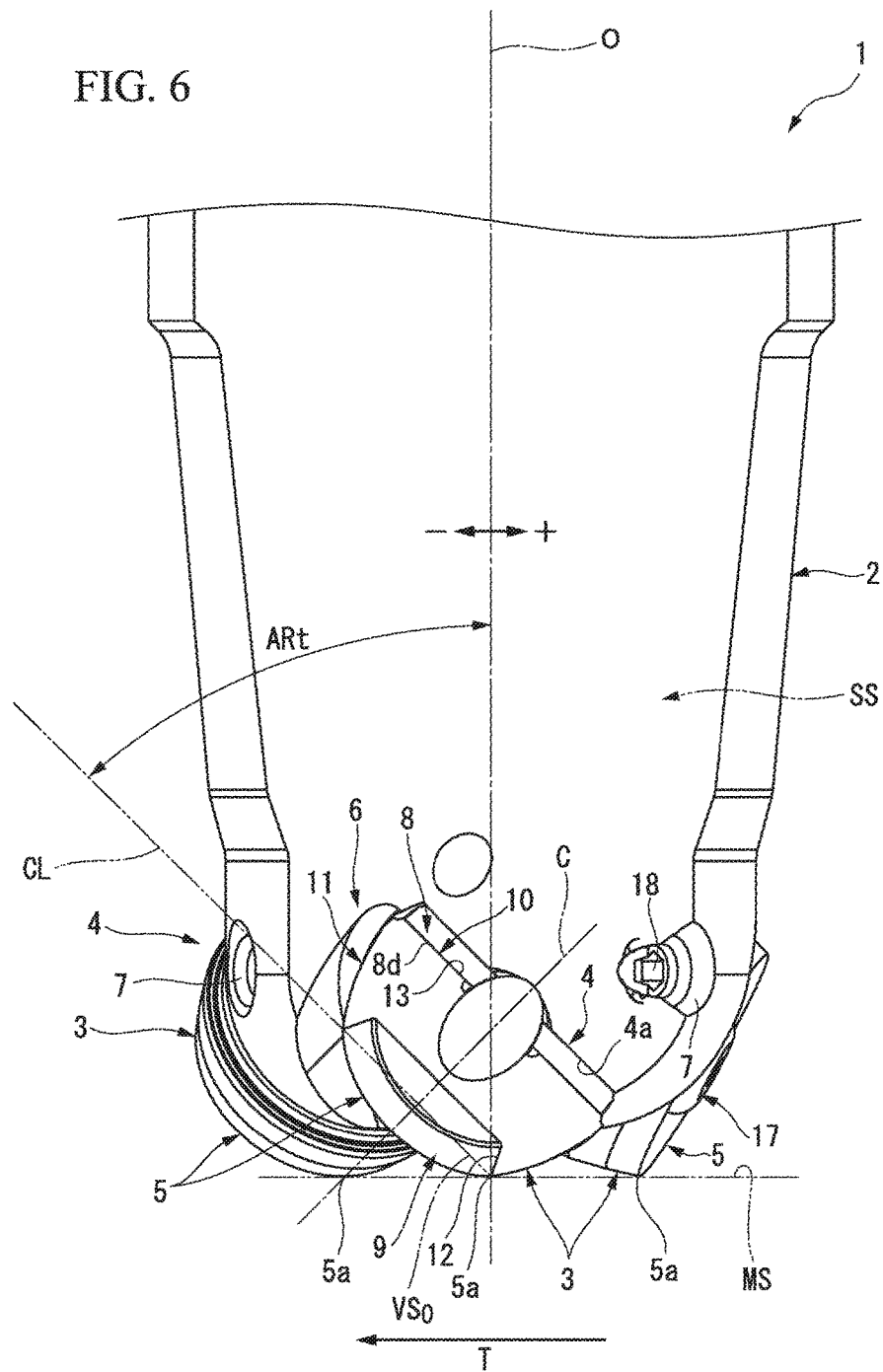
FIG. 6 is an enlarged view of a main portion of FIG. 5.
Figure 7:
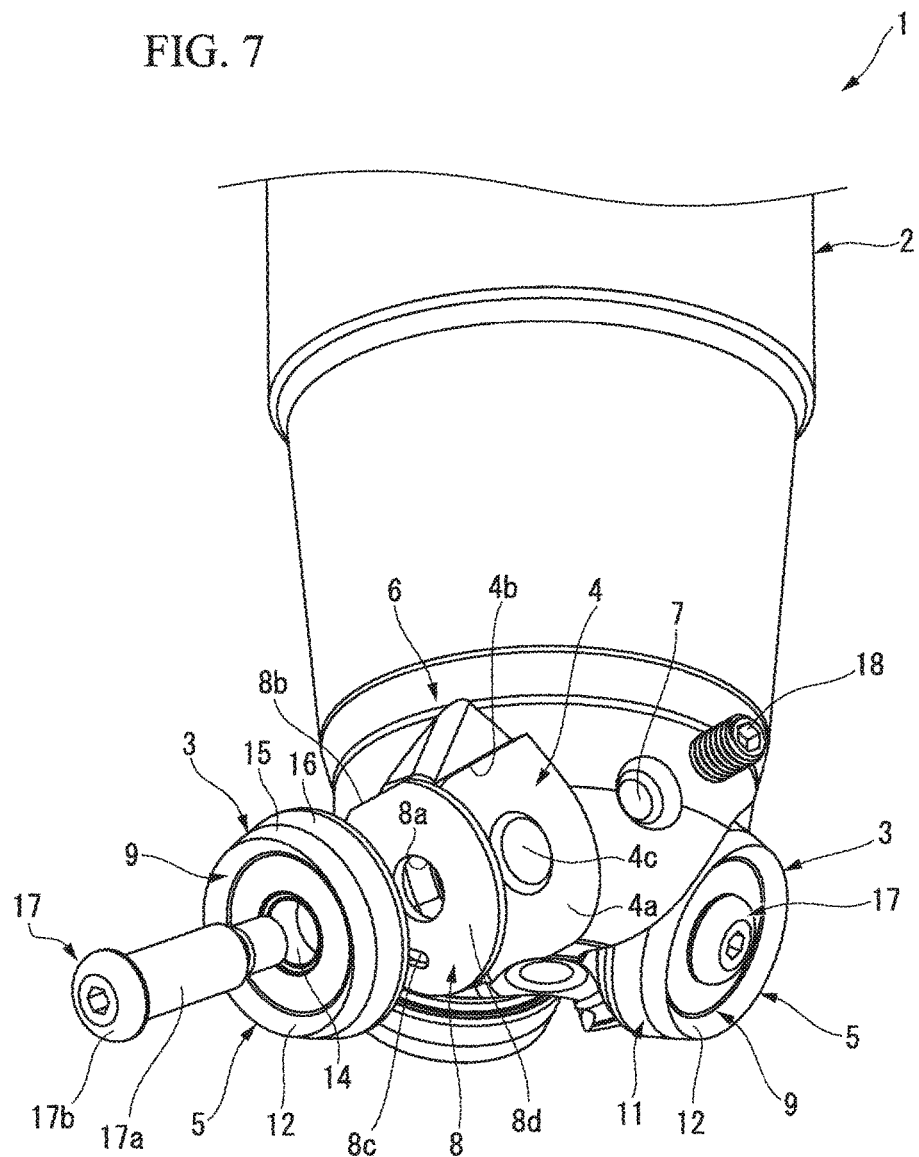
FIG. 7 is an exploded perspective view of a main portion of the rotating-cutting-edge-type milling tool related to the first embodiment of the present invention.
Figure 8:
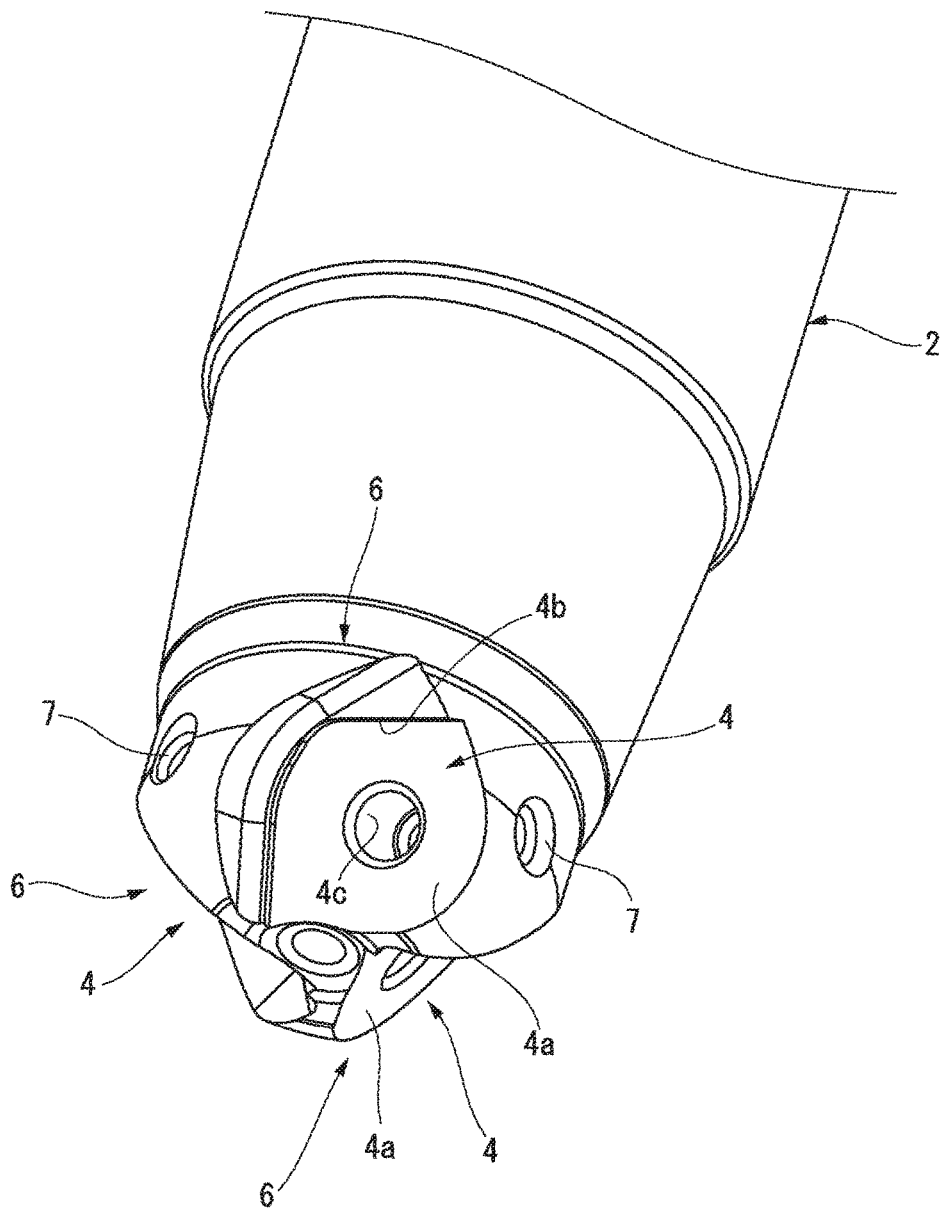
FIG. 8 is an enlarged perspective view of a distal end portion of a tool main body of the rotating-cutting-edge-type milling tool related to the first embodiment of the present invention.

In FIG. 8, the insert attachment seats 4 are formed with attachment surfaces 4a which face the tool rotation direction T, restricting surfaces 4b which each rise from circumferential edge portions of the attachment surfaces 4a, rotary shaft mounting holes 4c which are each drilled in the attachment surfaces 4a, and a coolant hole (not shown) which ejects a coolant (cutting oil) between the insert attachment seat 4 and the cutting insert 3. Also, as shown in FIGS. 6 and 7, in this embodiment, a sheet-shaped thrust sliding bearing member (a rotating mechanism) 8 which is located between the cutting insert 3 and the attachment surface 4a is provided at the insert attachment seat 4.

Figure 3:
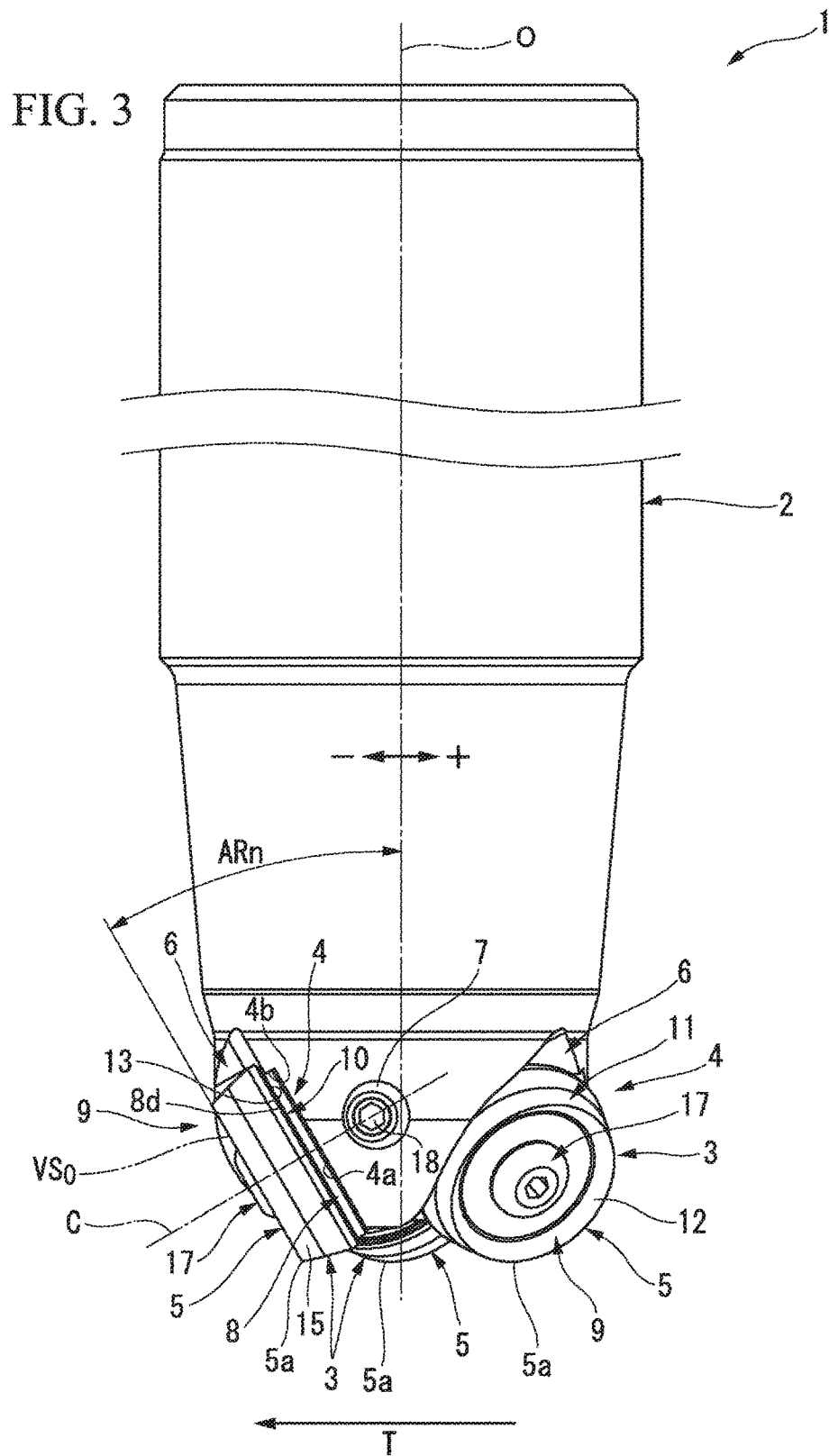
FIG. 3 is a side view showing an arrow B view of the rotating-cutting-edge-type milling tool of FIG. 1.

In FIG. 8, the attachment surface 4a is formed in a substantially circular planar shape to correspond to a shape of the cutting insert 3. To be specific, the attachment surface 4a has an axisymmetric geometry centering on the insert axial line C. Note that the "axisymmetric geometry" described in this specification includes a constitution with a strictly axisymmetric geometry and a constitution with a roughly axial symmetric shape. When the tool main body 2 shown in FIG. 3 is viewed from the side (when the insert attachment seat 4 is viewed from the side), the attachment surface 4a is gradually inclined rearward in the tool rotation direction T as it goes toward the distal end (a lower side of FIG. 3) of the tool main body 2. Also, in this embodiment, the attachment surface 4a is gradually inclined rearward in the tool rotation direction T as it goes outward in the tool radial direction.

The restricting surface 4b is a planar wall surface, which rises forward in the tool rotation direction T from a posterior end edge on the attachment surface 4a of the tool main body 2 and faces the tool distal end direction. The restricting surface 4b extends linearly when the attachment surface 4a of the insert attachment seat 4 is viewed from the front.

The rotary shaft mounting holes 4c has a multi-stage cylindrical hole shape, and an inner diameter of an end portion (an opening) of the rotary shaft mounting hole 4c, which is open in the attachment surface 4a, is one step greater than an inner diameter of a portion other than the opening. The portion other than the opening in the rotary shaft mounting hole 4c is a female threaded portion on which a female threading process is performed.

Also, a portion of the distal end portion of the tool main body 2, which is between the insert attachment seats 4 adjacent to each other in the tool circumferential direction, is open in an outer periphery surface of the distal end portion thereof, and is formed with a screw hole 7 which is in communication with an inside of the rotary shaft mounting hole 4c extending in the tool radial direction.

The coolant hole is in communication with the main shaft of the machine tool which is mounted on the posterior end of the tool main body 2 via an inside of the tool main body 2. When the attachment surface 4a of the insert attachment seat 4 is viewed from the front, a central axial line of the coolant hole extends in the insert circumferential direction of the cutting insert 3 (in a tangent line direction in the insert circumferential direction), and a direction of the coolant ejected from the coolant hole which is open in the attachment surface 4a is set to a direction in which the cutting insert 3 with respect to the insert attachment seat 4 is rotated in a driven manner.

In FIG. 7, the thrust sliding bearing member (a sliding bearing member) 8 has a discoid shape, and a hole 8a, through which the thrust sliding bearing member 8 can pass, is open in centers of a pair of circular surfaces which face a thickness direction thereof (a central axial line direction of the thrust sliding bearing member 8). Also, a portion of an outer periphery surface of the thrust sliding bearing member 8 is formed with a cutout portion 8b which is cut linearly when the thrust sliding bearing member 8 is viewed from the front in a thickness direction thereof. The thrust sliding bearing member 8 is formed with a coolant flow hole 8c through which the thrust sliding bearing member 8 passes in the thickness direction.

When the thrust sliding bearing member 8 is provided at the insert attachment seat 4 as in this embodiment, one circular surface 8d, on which the cutting insert 3 sits, among a pair of circular surfaces of the thrust sliding bearing member 8, which face a thickness direction thereof, is an attachment surface in the insert attachment seat 4. In other words, when the insert attachment seat 4 includes the thrust sliding bearing member 8, a rear surface 10 of the cutting insert 3 (a surface which faces the rearward in the tool rotation direction T) sits on the one circular surface (an attachment surface) 8d of the thrust sliding bearing member 8 of the insert attachment seat 4, which faces the forward in the tool rotation direction T. The one circular surface 8d has an axisymmetric geometry centering on the insert axial line C.

The hole 8a is in communication with the rotary shaft mounting hole 4c, and the coolant flow hole 8c is in communication with the coolant hole in a state in which the thrust sliding bearing member 8 is arranged on the attachment surface 4a. Also, the cutout portion 8b can be arranged opposite to the restricting surface 4b and locked. Thus, rotation of the thrust sliding bearing member 8 with respect to the attachment surface 4a in the insert circumferential direction is restricted.

In this embodiment, the cutting insert 3 is more easily rotated in a driven manner in a predetermined insert circumferential direction by bringing the coolant, which is ejected via the coolant flow hole 8c from the coolant hole, into contact with a seating surface 13 of the cutting insert 3 using only the force received by the cutting edge 5 (which is the cutting force or cutting resistance and includes the cutting edge force or the component of edge force) when the cutting insert 3 cuts into the work material at the time of cutting, instead of rotating the cutting insert 3 with respect to the insert attachment seat 4 in a driven manner.

Note that, in this embodiment, an example in which the thrust sliding bearing member 8 is provided at the insert attachment seat 4 is described, but the present invention is not limited thereto. In addition, for example, a thrust rolling bearing member (a rolling bearing member) may be provided at the insert attachment seat 4 instead of the thrust sliding bearing member 8. In this case, the rear surface 10 of the cutting insert 3 sits on an attachment surface of the thrust rolling bearing member of the insert attachment seat 4, which faces the forward in the tool rotation direction T. When neither of such bearing members are not provided at the insert attachment seat 4, the rear surface 10 of the cutting insert 3 may directly sit on the attachment surface 4a of the tool main body 2.

Figure 9A:
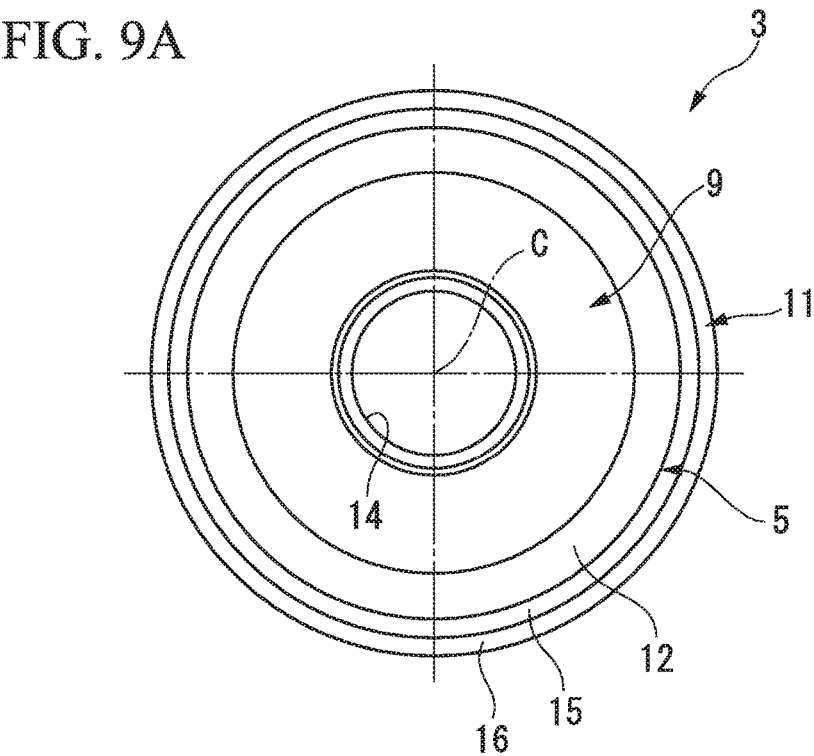
FIG. 9A is a top view of a front surface in an insert axial line direction of a cutting insert mounted in the rotating-cutting-edge-type milling tool related to the first and second embodiments of the present invention, which is viewed from the front.
Figure 9B:
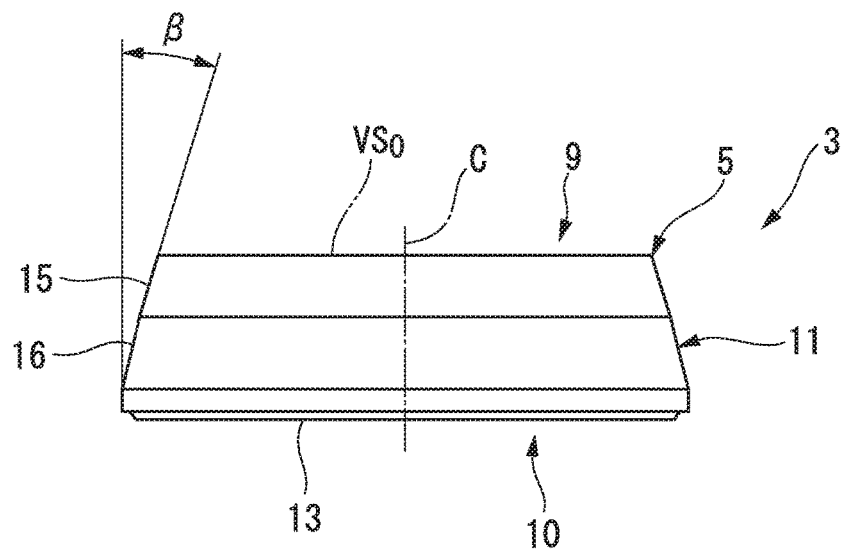
FIG. 9B is a side view of an outer periphery surface in an insert radial direction of the cutting insert mounted in the rotating-cutting-edge-type milling tool related to the first and second embodiments of the present invention, which is viewed from the front.
Figure 10:
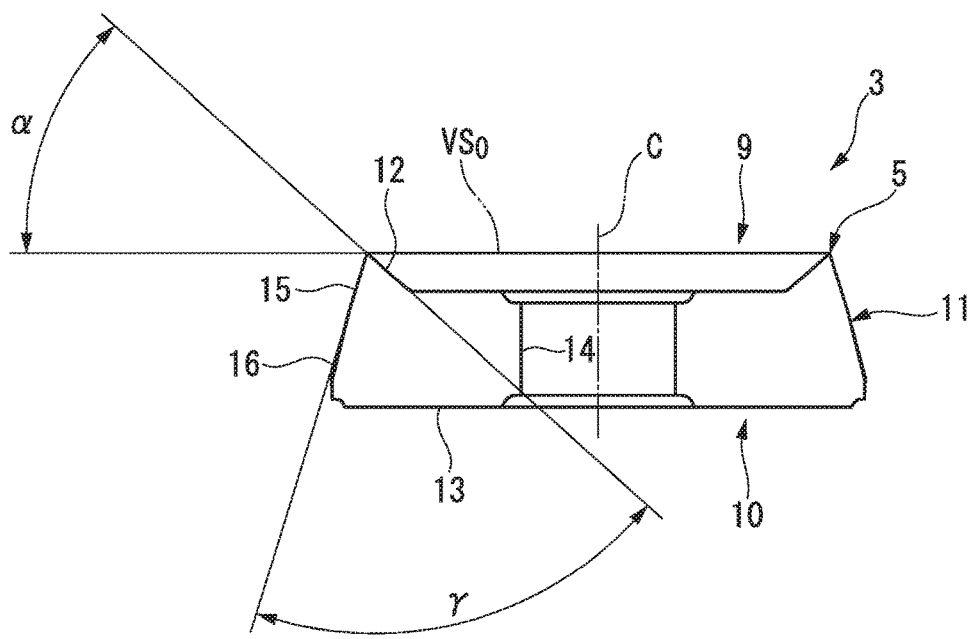
FIG. 10 is a side cross-sectional view (a vertical cross-sectional view) of the cutting insert of FIG. 9B.

As shown in FIGS. 9A, 9B, and 10, the cutting insert 3 has front and rear surfaces 9 and 10 which intersect the insert axial line C (which are substantially orthogonal to the insert axial line C) and an outer periphery surface 11 which connects circumferential edges of the front and rear surfaces 9 and 10. Note that the "front and rear surfaces 9 and 10 which intersect the insert axial line C" described in this specification refers to a state in which the insert axial line C is located inside a through hole 14 to be described below which is open to pass through the front and rear surfaces 9 and 10 and the insert axial line C passes through centers (virtual centers) of the front and rear surfaces 9 and 10. The outer periphery surface 11 extends in the insert axial line C direction and connects the circumferential edges of the front and rear surfaces 9 and 10.

As shown in FIGS. 1 to 6, the front surface 9 among the front and rear surfaces 9 and 10 is located to face the forward in the tool rotation direction T, the rear surface 10 is located to face the rearward in the tool rotation direction T, and the cutting insert 3 sits on the insert attachment seat 4 (the thrust sliding bearing member 8 of the insert attachment seat 4 in this embodiment) in a state in which the cutting insert 3 is mounted on the insert attachment seat 4 of the tool main body 2.

In FIGS. 9A, 9B, and 10, a circumferential edge of the front surface 9 is formed with the cutting edge 5 having a circular shape which extends in the insert circumferential direction and located on a cutting edge virtual plane $VS_0$ which is orthogonal to the insert axial line C, and the cutting edge 5 protrudes more in the insert axial line C direction than a portion other than the cutting edge 5 in the front surface 9.

In FIG. 10, an inside of the front surface 9 in the insert radial direction of the cutting edge 5 is formed with a tapered rake face 12 which is gradually inclined toward the rear surface 10 from the front surface 9 in the insert axial line C direction it goes inward in the insert radial direction from the cutting edge 5. Note that, in this specification, a direction in the insert axial line C direction, which is directed toward the rear surface 10 from the front surface 9 is simply referred to as the rear surface 10 direction in the insert axial line C direction in some cases. Also, a direction in the insert axial line C direction, which is directed toward the front surface 9 from the rear surface 10 is simply referred to as the front surface 9 direction in the insert axial line C direction.

When a portion including the insert axial line C of the cutting insert 3 shown in FIG. 10 is viewed in the longitudinal cross section, an angle α at which the rake face 12 is inclined with respect to the cutting edge virtual plane $VS_0$ is in a range of, for example, 35 degrees to 50 degrees. A portion other than the cutting edge 5 and the rake face 12 in the front surface 9 has a planar shape which is perpendicular to the insert axial line C.

An outer periphery edge portion of the rear surface 10 is recessed one step compared to a portion other than the outer periphery edge portion thereof. A portion other than the outer periphery edge portion in the rear surface 10 is the seating surface 13 which sits on an attachment surface (the circular surface 8d of the thrust sliding bearing member 8 in this embodiment) of the insert attachment seat 4. In this embodiment, the seating surface 13 has a planar shape which is perpendicular to the insert axial line C to correspond to the attachment surface of the insert attachment seat 4 having a planar shape which is perpendicular to the insert axial line C.

The cutting insert 3 is formed with the through hole 14 which extends on the insert axial line C and is open to pass through the front and rear surfaces 9 and 10. In FIGS. 9A and 10, diameters of both end portions of the through hole 14 in the insert axial line C direction are greater than that of a portion other than both end portions. In the illustrated example, a portion other than both end portions in the through hole 14 has a substantially constant inner diameter over the entire insert axial line C direction.

Also, the outer periphery surface 11 of the cutting insert 3 is formed with a tapered flank face 15 which is gradually inclined outward in the insert radial direction as it goes toward the rear surface 10 from the front surface 9 in the insert axial line C direction from the cutting edge 5 which forms an outer periphery end edge of the front surface 9. When a portion including the insert axial line C of the cutting insert 3 is viewed in the longitudinal cross section, an angle β at which the flank face 15 is inclined with respect to the insert axial line C (a virtual straight line which is parallel to the insert axial line C) is in a range of, for example, 10 degrees to 35 degrees.

A portion of the outer periphery surface 11 of the cutting insert 3, which is at a portion closer to the rear surface 10 direction in the insert axial line C direction than the flank face 15, is formed with a body clearance 16 having a gentler inclination with respect to the insert axial line C than that of the flank face 15. In other words, the amount of displacement of the body clearance 16 is smaller than an amount of displacement in the insert radial direction per unit length of the flank face 15 in the insert axial line C direction. Also, an end portion of the outer periphery surface 11, which is in the rear surface 10 direction in the insert axial line C direction, has a cylindrical surface shape centering on the insert axial line C. With such a constitution, a diameter of the outer periphery surface 11 of the cutting insert 3 is increased toward the rear surface 10 from the front surface 9 in the insert axial line C direction.

Also, a wedge angle γ centering on the cutting edge 5 formed between the rake face 12 and the flank face 15 is in a range of, for example, 65 degrees to 75 degrees when viewed in the longitudinal cross section shown in FIG. 10.

In FIG. 7, the rotating-cutting-edge-type milling tool 1 includes a rotating shaft (a rotary support body) 17 and a restricting portion as a clamping mechanism of a cutting insert configured to rotatably mount the cutting insert 3 on the insert attachment seat 4. The rotating shaft 17 has a shaft portion 17a, a diameter of which is smaller than that of the through hole 14 of the cutting insert 3 and the hole 8a of the thrust sliding bearing member 8, and which is inserted through in the through hole 14 and the hole 8a and is attached to the insert attachment seat 4 and a head portion 17b, a diameter of which is larger than that of the through hole 14 and which is located to have a gap between the head portion 17b and the front surface 9.

An end portion of the shaft portion 17a, which is opposite to the head portion 17b, is a male screw portion, a diameter of which is smaller than that of a portion other than the end portion, and on which a male threading process is performed. The male screw portion of the shaft portion 17a is screwed into a female threaded portion of the rotary shaft mounting hole 4c so that the rotating shaft 17 is removably mounted on the insert attachment seat 4, and the amount of screwing of the male screw portion with respect to the female threaded portion is adjusted so that a position of the rotating shaft 17 with respect to the insert attachment seat 4 in the insert axial line C direction can be adjusted.

A set screw 18 is screwed into the screw hole 7 of the tool main body 2, and a tip of the set screw 18 is brought into contact with the shaft portion 17a of the rotating shaft 17 so that movement of the rotating shaft 17 with respect to the insert attachment seat 4 in the insert axial line C direction can be restricted, and the restricting portion having the screw hole 7 and the set screw 18 is configured. Note that, in this embodiment, the tip of the set screw 18 is in contact with a portion other than the male screw portion in the shaft portion 17a (refer to FIG. 24).

As shown in FIGS. 3 to 6, in an example of this embodiment, the insert axial line C of the cutting insert 3 extends to be gradually inclined toward the tool distal end as it goes forward in the tool rotation direction T in a state in which the cutting insert 3 is mounted on the insert attachment seat 4. Here, the present invention is not limited thereto, and the insert axial line C of the cutting insert 3 may extend to be gradually inclined outward in the tool radial direction as it goes forward in the tool rotation direction T. Alternatively, the insert axial line C of the cutting insert 3 may extend to be gradually inclined forward in the tool rotation direction T and outward in the tool radial direction as it goes forward in the tool rotation direction T. To be specific, an inclined direction of the insert axial line C is determined by setting a representative cutting point as will be described below. Here, the inclined direction of the insert axial line C is not uniquely determined by determining the representative cutting point, but is determined in consideration of for example, an inclined direction or the like, in which the cutting insert 3 is more easily rotated in a driven manner, as well.

As shown in FIGS. 12 to 15, when it is assumed that, among insert radial directions which are orthogonal to the insert axial line C, a point of intersection of a predetermined insert radial direction ID passing through a point of action P of a concentrated load when force, which acts on the cutting insert 3 from the work material in a distributed manner at a time of a cutting operation, is regarded as a concentrated load (when the force is similar to the concentrated load) and the cutting edge 5 is a representative cutting point (any of reference numeral 5a, 5b, and 5c which will be described below). A direction (left and right directions of FIG. 13) which is directed in a line of intersection L of a first virtual plane $VS_1$ which is perpendicular to a tangent line L2 of the cutting edge 5 passing through the representative cutting point and a second virtual plane $VS_2$ which includes the tangent line L2 and a virtual straight line L1 in an instantaneous cutting direction at the representative cutting point, in which the direction (a right direction of FIG. 13) is directed rearward in the tool rotation direction T, is a principal force direction. Among force which acts on the cutting insert 3 from the work material at the time of the cutting operation, a component of force at the representative cutting point in the principal force direction is a principal force F1, and a component of force which is perpendicular to the principal force direction and is directed in a back force direction (an upper direction of FIG. 13), which is directed inward in the insert radial direction, is a back force F2. An extending direction of the insert axial line C is set parallel or to have a predetermined minute angle (that is, set substantially parallel) to a direction of a resultant force F3 of the principal force F1 and the back force F2 on a surface of the first virtual plane $VS_1$ shown as a cross-sectional view in FIG. 13.

Figure 13:
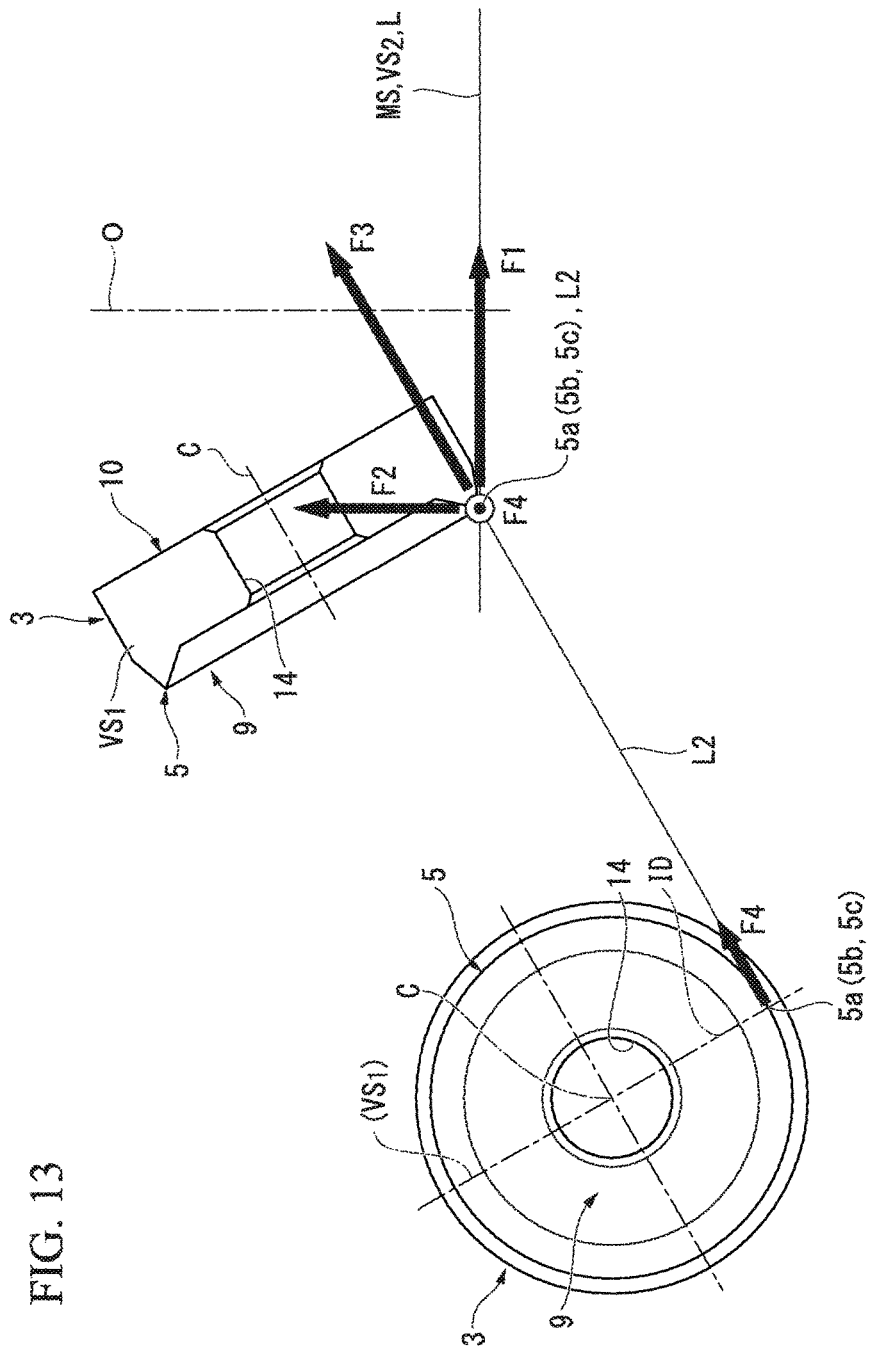
FIG. 13 is a view showing a direction of a resultant force of a principal force and a back force and a direction in which an insert axial line extends, which are substantially set parallel to each other, on a surface of a first virtual plane which is perpendicular to a tangent line of a cutting edge passing through the representative cutting point.

Note that, among force (which is the cutting force or the cutting resistance and includes the cutting edge force or the component of edge force) received by the cutting edge 5 when the cutting edge 5 cuts into the work material, force indicated by reference numeral F4 in FIG. 13 is a component of force (that is, a component of force which passes through the representative cutting point, and a direction of which is orthogonal to the first virtual plane $VS_1$) is directed in a direction of the tangent line L2 which passes through the representative cutting point of the cutting edge 5, and the component of force is referred to as a feed force F4 in this specification. In this embodiment, the feed force F4 is set outward in the tool radial direction.

The "representative cutting point" described in this specification will be described below.

The force received by the cutting insert 3 when the cutting edge 5 of the cutting insert 3 mounted on the tool main body 2 cuts into the work material at the time of the cutting operation is a distributed load which is distributed to an entire contact area (in general, chips are substantially discharged from a cut-in region in a central direction of the cutting insert 3 while coming into contact with the rake face 12) of the rake face 12 and the work material/chips including the cut-in region (a hatched region of FIG. 12; which is also referred to as a "cut cross section") of the cutting insert 3, which cuts into the work material. When the distributed load is regarded (assumed) as a concentrated load on the basis of the force and a moment (a moment viewed from an insert center) received by the cutting insert 3 due to the distributed load, the point of intersection of the predetermined insert radial direction ID passing through the point of action (a point corresponding to a center of gravity of the distributed load) P of the concentrated load and the cutting edge 5 is referred to as the "representative cutting point" in this specification. To be specific, in FIG. 12, the point of action of the concentrated load when the distributed load which acts on the cutting insert 3 from the work material at the time of the cutting operation is regarded as the concentrated load is indicated as reference numeral P, and the point of intersection 5c of the predetermined insert radial direction ID passing through the point of action P and the circular cutting edge 5 is the representative cutting point. Also, the representative cutting point can be said to be a point on the cutting edge 5, which is closest to a point of average action of the cutting force at the time of the cutting operation. The representative cutting point is located on the cutting edge 5 of the cutting insert 3. However, even if the cutting insert 3 is rotated around the insert axial line C in the driven manner, the representative cutting point is not rotated together with the cutting insert 3, and a relative position thereof with respect to the tool is not changed. Note that, since the point of action P of the force is changed, for example, when the depth of cut in the tool axial line O direction is changed, the representative cutting point is moved with it.

Also, the "instantaneous cutting direction at the representative cutting point" is a direction of a relative instantaneous speed in the representative cutting point between the tool and the work material and is mainly rotated along with rotation of the tool.

Figure 12:
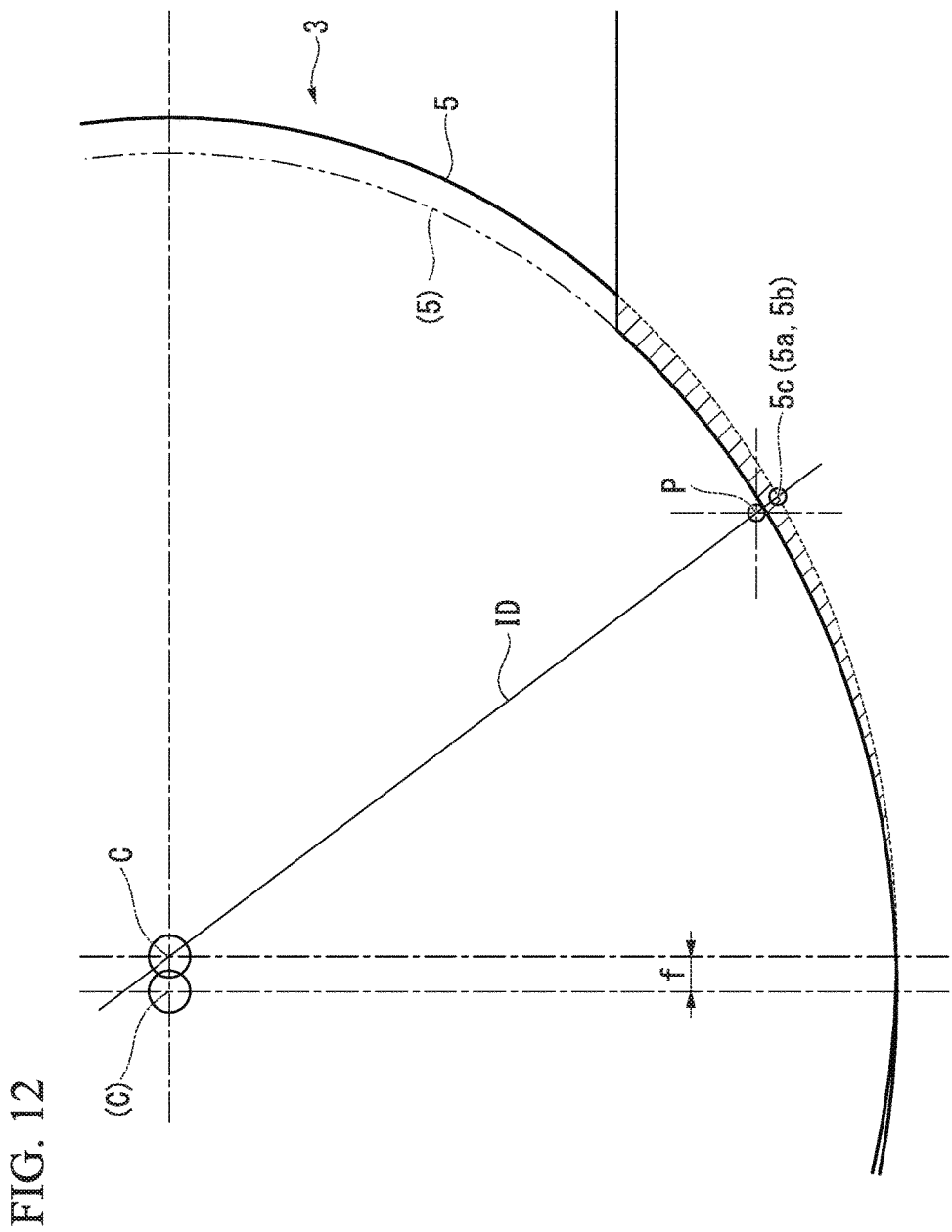
FIG. 12 is an enlarged view of a shape of a cut cross section which is cut by a cutting edge portion when a cutting edge of a cutting insert cuts into a work material, and a view showing a representative cutting point on the cutting edge.

Note that an amount depending on the feed per tooth is indicated as reference numeral f in FIG. 12, and after the tool main body 2 of the rotating-cutting-edge-type milling tool 1 is fed in the tool radial direction so that the cutting edge 5 (the cutting edge 5 indicated by an alternating long and two short dashes line) of the cutting insert 3, which is in the forward in the tool rotation direction T, cuts the work material, a separate (current) cutting edge 5 (the cutting edge 5 indicated by a solid line) of the cutting insert 3, which is in the rearward in the tool rotation direction T of the cutting edge 5, cuts the hatched region of FIG. 12. Note that the "amount f depending on the feed per tooth" is different from a generally called feed per revolution fz, and also depends on a tool rotation position and an attachment angle of the insert axial line C. Thus, the foregoing description is used herein.

The representative cutting point is set at a predetermined position in an arc-shaped portion with a central angle of 90 degrees (an arc of ¼ when a circumference of the cutting edge 5 is set to 1) between a portion (a tool distal end edge 5a) located at a distal end in the tool axial line O direction and a portion (a tool outer diameter edge 5b) located at an outer end in the tool radial direction, which is in an entire circumference of the cutting edge 5 of the cutting insert 3 mounted on the tool main body 2.

To be more specific, for example, when a desired type of a cutting operation using the rotating-cutting-edge-type milling tool 1 is a "face milling process" or the like, the representative cutting point on the cutting edge 5 is near the tool distal end edge 5a. Also, when the desired type of the cutting operation is a "shoulder milling process" or the like, the representative cutting point on the cutting edge 5 is near the tool outer diameter edge 5*b*. When the desired type of the cutting operation is an "R milling process" or the like serving as a combination process of the face milling process and the shoulder milling process, the representative cutting point on the cutting edge 5 is an intermediate point 5*c* which is between the tool distal end edge 5*a* and the tool outer diameter edge 5*b*.

In other words, the representative cutting point is at a predetermined position (a predetermined range) on the cutting edge 5, which can be predetermined in advance by an expected cutting operation, and an inclination of the insert axial line C is set substantially parallel to the direction of the resultant force F3 of the principal force F1 and the back force F2 at the representative cutting point in this embodiment.

Here, the expression "extending direction of the insert axial line C is set parallel or to have the predetermined minute angle (that is, set to be parallel) to the direction of the resultant force F3 of the principal force F1 and the back force F2 on the surface of the first virtual plane $VS_1$," described in this specification specifically means that an angle at which the insert axial line C is inclined with respect to the direction of the resultant force F3 is in a range of ±20 degrees on the surface of the first virtual plane $VS_1$ (when viewed in the direction of the tangent line L2 of the cutting edge 5 passing through the representative cutting point) in a range of a cutting condition which can be assumed using the rotating-cutting-edge-type milling tool 1. In other words, the angle formed by two straight lines such as the insert axial line C and the direction of the resultant force F3 is in the range of ±20 degrees, which indicates the expression "set parallel or to have the predetermined minute angle." Note that the angle is preferably ±10 degrees and the angle is more preferably ±5 degrees. When the angle is 0 degree, the insert axial line C is parallel (set parallel) to the direction of the resultant force F3.

Note that the above-described angle at which the insert axial line C is inclined with respect to the direction of the resultant force F3 is in the range of ±20 degrees means that the angle formed by the direction of the resultant force F3 and the insert axial line C is 20 degrees or less. Also, the above-described angle at which the insert axial line C is inclined with respect to the direction of the resultant force F3 is in a range of ±10 degrees means that the angle formed by the direction of the resultant force F3 and the insert axial line C is 10 degrees or less. The above-described angle at which the insert axial line C is inclined with respect to the direction of the resultant force F3 is in a range of ±5 degrees means that the angle formed by the direction of the resultant force F3 and the insert axial line C is 5 degrees or less.

The extending direction of the insert axial line C with respect to the direction of the resultant force F3 is not limited to only "parallel" and is set to have a slight angular range because the following reasons.

It is considered that the direction of the resultant force F3 is changed by, for example, a shape of the rake face 12 of the cutting insert 3, a cutting edge process and a wear state of the cutting edge 5, a coefficient of friction of the work material, a cutting condition (the depths of cut, the feed, or the like), or the like. For this reason, since it is not easy to accurately set the extending direction of the insert axial line C parallel to the direction of the resultant force F3, the expression "set parallel or to have the predetermined minute angle" is used as a range in which an effect of the present invention can be sufficiently acquired.

With regard to the rotating-cutting-edge-type milling tool 1 of this embodiment, it is described in brief that the resultant force F3 and the insert axial line C are substantially parallel to each other, and an example in which the representative cutting point on the cutting edge 5 is set at the tool distal end edge 5*a* is used.

Figure 4:
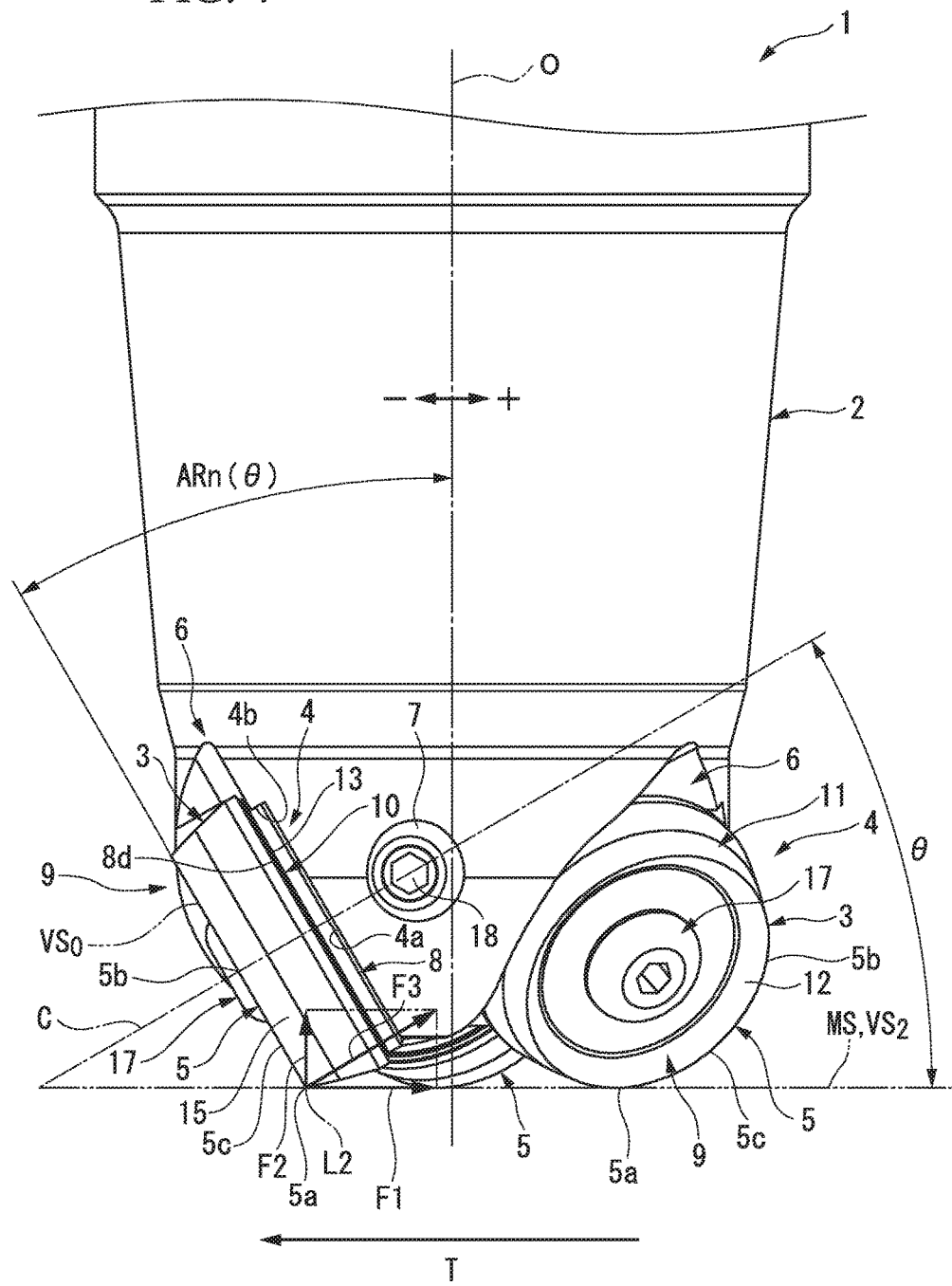
FIG. 4 is an enlarged view of a main portion of FIG. 3.

In other words, FIGS. 3 and 4 are views when viewed in the direction of the tangent line L2 which passes through the tool distal end edge 5*a* (the representative cutting point of this embodiment) of the cutting edge 5 of the cutting insert 3 shown in FIG. 1, and the direction of the resultant force F3 of the principal force F1 and the back force F2 is set parallel or to have a predetermined minute angle to the insert axial line C (on the surface of the first virtual plane $VS_1$ which is perpendicular to the tangent line L2) when viewed in the direction of the tangent line L2.

A machined surface of the work material, which is cut by the rotating-cutting-edge-type milling tool 1, is indicated by reference numeral MS in FIG. 4.

The machined surface MS described in this specification is a virtual plane (that is the above-described second virtual plane $VS_2$) including the tangent line L2 passing through the representative cutting point of the cutting edge 5 and a virtual straight line (a tangent line of a virtual circle VC indicated by reference numeral L1 of FIG. 1) in an instantaneous cutting direction at the representative cutting point, and is a virtual component element (a concept), in which a minute range including the representative cutting point spreads and is indicated in a planar shape and which is used showing the present invention, on a concave curved surface which is actually processed by the discoid cutting insert 3. Also, an angle (an angle of inclination) θ at which the insert axial line C is inclined with respect to the machined surface MS (the second virtual plane $VS_2$) is in a range of for example, 20 degrees to 70 degrees when viewed in the direction the tangent line L2 shown in FIG. 4.

Here, with regard to a range of the angle θ, a reference is provided by determining the inclination of the insert axial line C in accordance with the direction of the resultant force F3 set in accordance with a desired cutting operation condition, and a slight allowable width (a positive or negative angular range) is preferably provided to an angle serving as the reference. For example, when an angle serving as a reference is 45 degrees, an angle θ is preferably in a range of 45 degrees±20 degrees, and more preferably in a range of 45 degrees±5 degrees (for example, refer to a range of an angle ARn (an angle range corresponding to the angle θ when the representative cutting point of the cutting edge 5 is on the tool distal end edge 5*a*) shown in a graph of FIG. 17).

Figure 5:
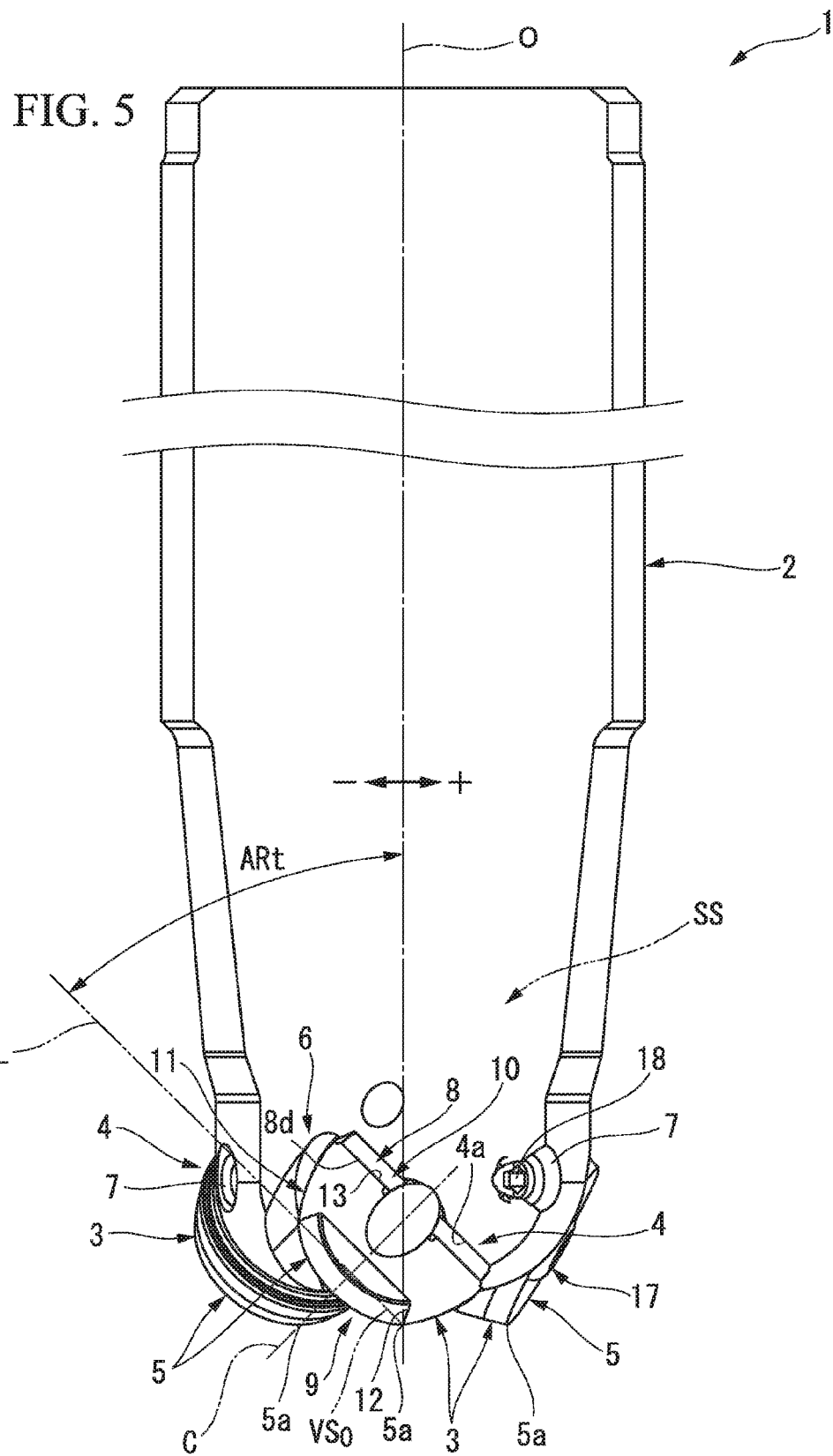
FIG. 5 is a side cross-sectional view showing a cross section taken along line E-E of the rotating-cutting-edge-type milling tool of FIG. 1.

FIGS. 5 and 6 are cross sections taken along line E-E, which is viewed from a predetermined tool radial direction D passing through the tool distal end edge 5*a* of the cutting edge 5, in the tool radial direction of the rotating-cutting-edge-type milling tool 1 shown in FIG. 1.

In FIG. 1, if a circle obtained by a locus when the tool distal end edge 5*a* (the representative cutting point) on the cutting edge 5, is rotated the tool circumferential direction, is set as a virtual circle VC. A virtual plane obtained by a locus when a tangent line L1 (a virtual straight line in an instantaneous cutting direction) of the virtual circle VC which passes through the tool distal end edge 5*a*, is moved parallel to the tool axial line O in the direction toward the tool posterior end, is set as a reference plane SS. In FIGS. 5 and 6 in which a side cross section (a longitudinal cross section) of the reference plane SS is shown, an angle ARt at which a cross line CL of the reference plane SS and the cutting edge virtual plane $VS_0$ including the circular cutting edge 5 is inclined with respect to the tool axial line O projected onto the reference plane SS is in a range of, for example, −30 degrees to −60 degrees. In other words, the angle ARt is an axial rake angle in which the instantaneous cutting direction in the tool distal end edge 5a of the cutting edge 5 used for cutting is considered, and is specifically a negative axial rake angle. If the angle ARt is −(minus), the angle ARt is the negative axial rake angle, and if the angle ARt is +(plus), the angle ARt is a positive axial rake angle when viewed in the longitudinal cross section including the reference plane SS shown in FIG. 6. To be specific, in FIG. 6, when the angle ARt is −, the cross line CL gradually extends forward in the tool rotation direction T as it goes toward the tool posterior end from the tool distal end edge 5a. Also, although not particularly shown, when the angle ARt is +, the cross line CL gradually extends rearward in the tool rotation direction T as it goes toward the tool posterior end from the tool distal end edge 5a. In FIG. 6, the tool axial line O coincides with a reference surface in which the angle ARt (the axial rake angle)=0 degree. Note that the reference surface is a virtual plane which is perpendicular to the instantaneous cutting direction in the tool distal end edge 5a of the cutting edge 5.

On the other hand, as shown in FIGS. 3 and 4, an angle ARn at which the cutting edge virtual plane $VS_0$ is inclined with respect to the tool axial line O is in a range of, for example, −30 degrees to −50 degrees when viewed in the tool radial direction which is perpendicular to the cutting edge virtual plane $VS_0$. In other words, the angle ARn is an axial rake angle in which the instantaneous cutting direction of the cutting insert 3 alone which is mounted on the tool main body 2 is not considered, and a negative axial rake angle. As shown in FIG. 4, when the angle ARn is −(minus), the angle ARn is the negative axial rake angle, and when the angle ARn is +(plus), the angle ARn is a positive axial rake angle when the rotating-cutting-edge-type milling tool 1 is viewed inward in the tool radial direction and when viewed from the side which is perpendicular to the cutting edge virtual plane $VS_0$. To be specific, in FIG. 4, when the angle ARn is −, the cutting edge virtual plane $VS_0$ gradually extends forward in the tool rotation direction T as it goes toward the tool posterior end from the tool distal end edge 5a. Also, although not particularly shown, when the angle ARn is +, the cutting edge virtual plane $VS_0$ gradually extends rearward in the tool rotation direction T as it goes toward the tool posterior end from the tool distal end edge 5a. In FIG. 4, the tool axial line O is parallel to the reference surface in which the angle ARn (the axial rake angle)=0 degree.

Since the representative cutting point is set at the tool distal end edge 5a of the cutting edge 5 in the rotating-cutting-edge-type milling tool 1 of this embodiment, as shown in FIG. 4, an angle of inclination θ formed by the machined surface MS (the second virtual plane $VS_2$) and the insert axial line C is the same as ARn which is described above.

Note that, since the angle ARt and the angle ARn are angles in which a shape of the rake face 12, which is adjacent to the cutting edge 5 of the cutting insert 3, is not considered, the angle ARt and the angle ARn can be said to be the apparent axial rake angle.

In this embodiment, the angle ARt is set to 45 degrees of negative (−45 degrees) and the angle ARn is set to 30 degrees of negative (−30 degrees).

In FIG. 1, an angle RR at which a cutting edge tangent line L2 of the cutting edge 5 which passes through the tool distal end edge 5a and extends outward in the tool radial direction, is inclined with respect to a predetermined tool radial direction D among the tool radial directions which passes through the tool distal end edge 5a, is in a range of, for example, −30 degrees to −75 degrees. In other words, the angle RR is a radial rake angle at the tool distal end edge 5a of the cutting edge 5 used for cutting and is specifically a negative radial rake angle. In this embodiment, the angle RR is 55 degrees of negative (−55 degrees). As shown in FIG. 1, in a front view when the rotating-cutting-edge-type milling tool 1 is viewed toward the posterior end from the distal end in the tool axial line O direction, when the angle RR is −(minus), the angle RR is the negative radial rake angle, and when the angle RR is +(plus), the angle RR is a positive radial rake angle. To be specific, in FIG. 1, when the angle RR is −, the cutting edge tangent line L2 gradually extends rearward in the tool rotation direction T as it goes outward in the tool radial direction from the tool distal end edge 5a. Also, when the angle RR is +, the cutting edge tangent line L2 gradually extends forward in the tool rotation direction T as it goes outward in the tool radial direction from the tool distal end edge 5a (refer to FIG. 20). In FIG. 1, the predetermined tool radial direction D coincides with the reference surface in which the angle RR (the radial rake angle)=0 degree.

Figure 11:
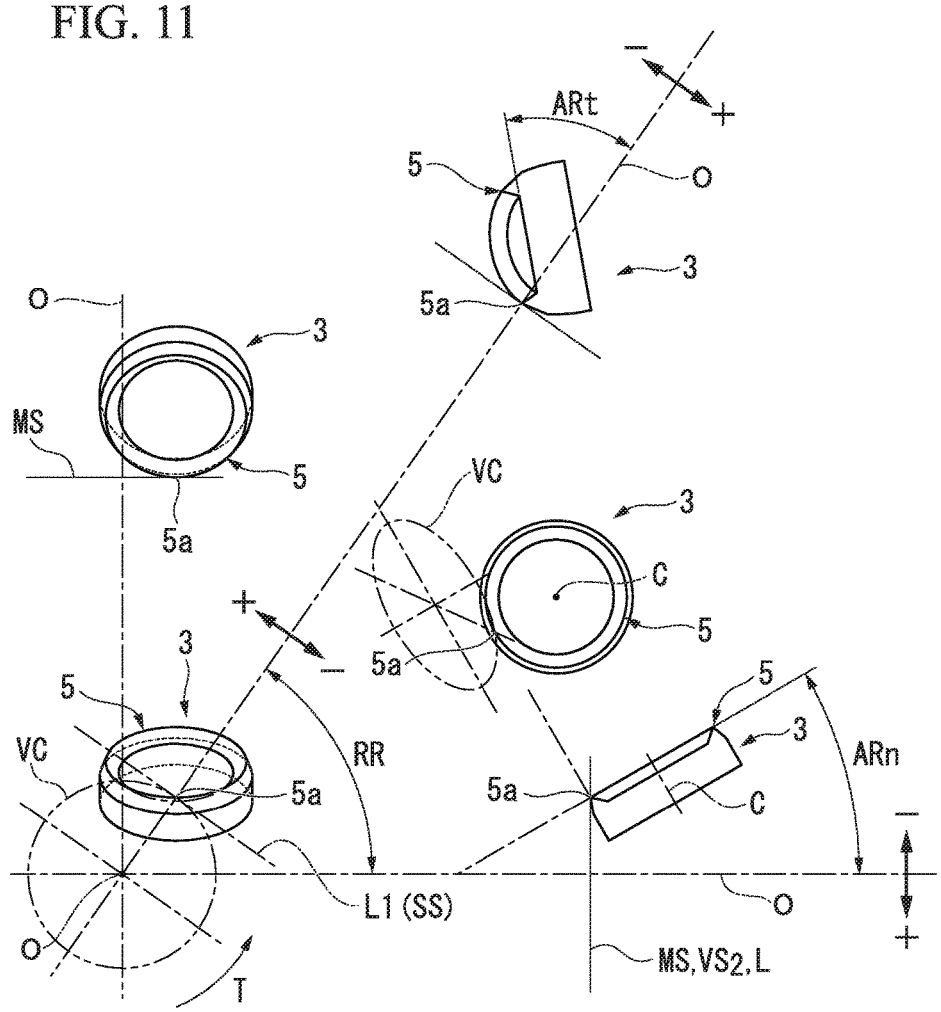
FIG. 11 is a view showing angles of a cutting insert which is mounted in a rotating-cutting-edge-type milling tool.

Note that FIG. 11 is a view in which angles such as the angles ARt, ARn, and RR which are described above are simplified.

FIG. 13 is a simplified diagram showing that the direction of the resultant force F3 of the principal force F1 and the back force F2 and the extending direction of the insert axial line C, which are described above, are substantially parallel to each other. Although the tool distal end edge 5a is the representative cutting point on the cutting edge 5 in FIG. 13, as described above, the tool outer diameter edge 5b on the cutting edge 5 or the intermediate point 5c between the tool distal end edge 5a and the tool outer diameter edge 5b may be the representative cutting point (with regard to positions of the tool outer diameter edge 5b and the intermediate point 5c on the circumference of the cutting edge 5, refer to FIGS. 1 and 4).

In other words, the present invention is not limited to the constitution of the rotating-cutting-edge-type milling tool 1 used for describing this embodiment. To be specific, when the representative cutting point is set at the tool distal end edge 5a as in this embodiment, the machined surface MS (the second virtual plane $VS_2$), in which the tool distal end edge 5a is set as the reference, is perpendicular to the tool axial line O, and the insert axial line C of the cutting insert 3 is substantially on a virtual plane which is perpendicular to the machined surface MS (the second virtual plane $VS_2$). On the other hand, when the representative cutting point is set at the tool outer diameter edge 5b, the machined surface MS (the second virtual plane $VS_2$), in which the tool outer diameter edge 5b is set as the reference, is parallel to the tool axial line O, and the insert axial line C of the cutting insert 3 is substantially on the virtual plane which is perpendicular to the machined surface MS (the second virtual plane $VS_2$). When the representative cutting point is set at the intermediate point 5c, the machined surface MS (the second virtual plane $VS_2$), in which the intermediate point 5c is set as the reference, is an inclined surface which is not perpendicular or parallel to the tool axial line O, and the insert axial line C of the cutting insert 3 is substantially on the virtual plane which is perpendicular to the machined surface MS (the second virtual plane $VS_2$).

FIGS. 14A to 16 are views in which the representative cutting point of the cutting insert 3 and the machined surface MS (the second virtual plane $VS_2$), in which the representative cutting point is set as the reference, are simplified.

Figure 14A:
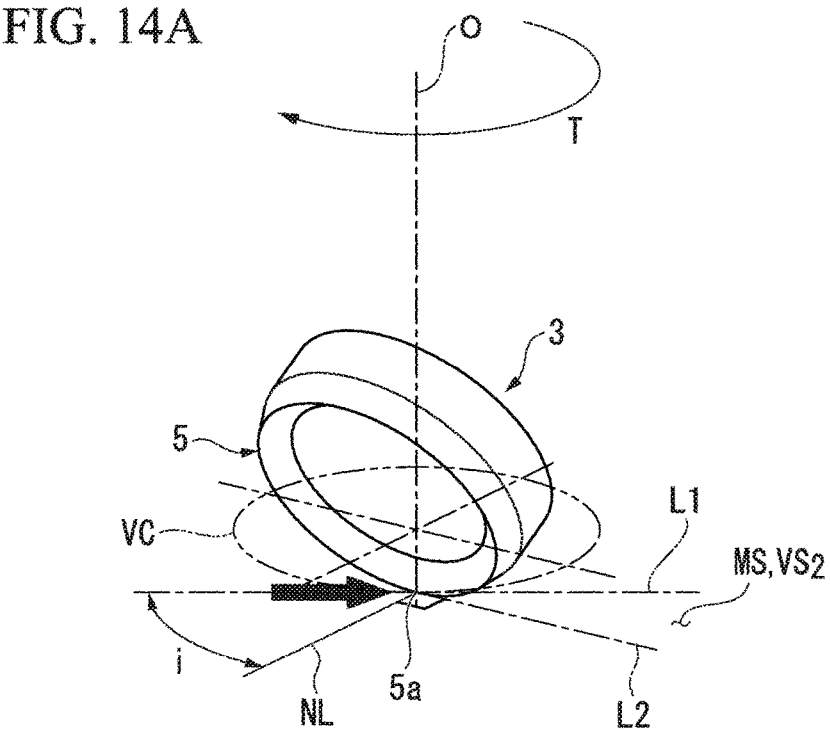
FIG. 14A is a perspective view showing a second virtual plane (a machined surface) and an angle of inclination of cutting when a representative cutting point is at a tool distal end edge (5a).
Figure 14B:
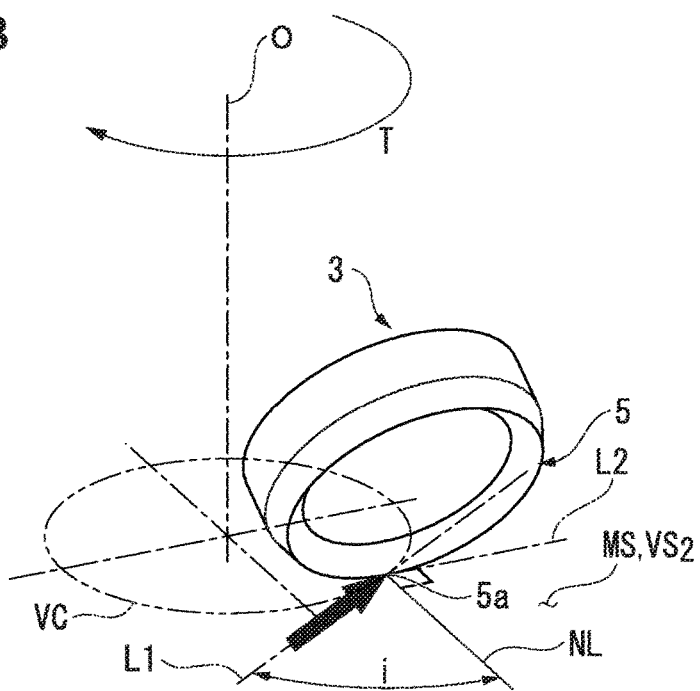
FIG. 14B is a perspective view showing a second virtual plane (a machined surface) and an angle of inclination of cutting when the representative cutting point is at the tool distal end edge (5a).

FIGS. 14A and 14B show a case in which the representative cutting point of the cutting insert 3 is set at the tool distal end edge 5*a*, and reference numeral i shown in the drawings indicates an angle of inclination of the cutting on the machined surface MS (the second virtual plane $VS_2$) serving as the virtual plane including the two straight lines at the tool distal end edge 5*a* such as the virtual straight line L1 (the tangent line L1 passing through the tool distal end edge 5*a* of the virtual circle VC serving as a rotational locus of the tool distal end edge 5*a* in the tool rotation direction T) in the instantaneous cutting direction and the tangent line L2 which passes through the tool distal end edge 5*a* of the cutting edge 5. When the representative cutting point is set at the tool distal end edge 5*a*, the machined surface MS (the second virtual plane $VS_2$) is the virtual plane which is perpendicular to the tool axial line O.

To be specific, an angle of inclination i of the cutting is an angle which is formed by a normal NL which is perpendicular to the tangent line L2 passing through the representative cutting point (the tool distal end edge 5*a* in FIGS. 14A and 14B) of the cutting edge 5 and the virtual straight line L1 (the tangent line L1) which extends in the instantaneous cutting direction of the representative cutting point on the machined surface MS (the second virtual plane $VS_2$). Note that the tangent line L1 is a tangent line which passes through the tool distal end edge 5*a* of the virtual circle VC serving as the rotational locus formed when the tool distal end edge 5*a* serving as the representative cutting point of the cutting edge 5 is rotated around the tool axial line O.

Figure 15:
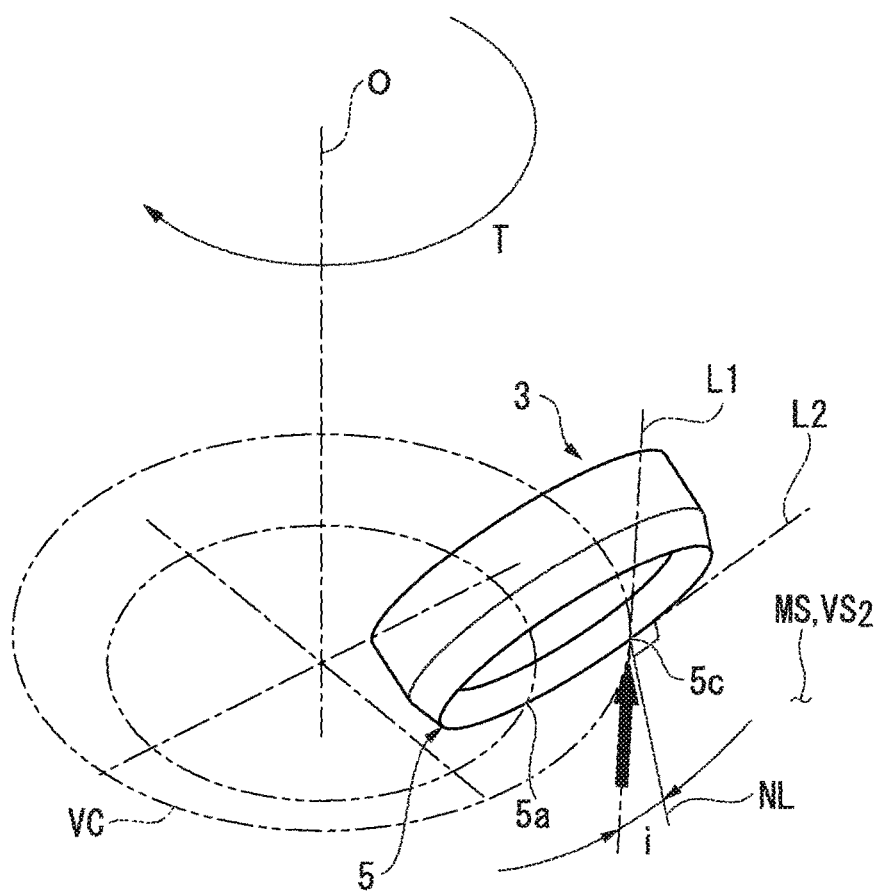
FIG. 15 is a perspective view showing a second virtual plane (a machined surface) and an angle of inclination of cutting when a representative cutting point is at an intermediate point (5c) between a tool distal end edge and a tool outer diameter edge.
Figure 16:
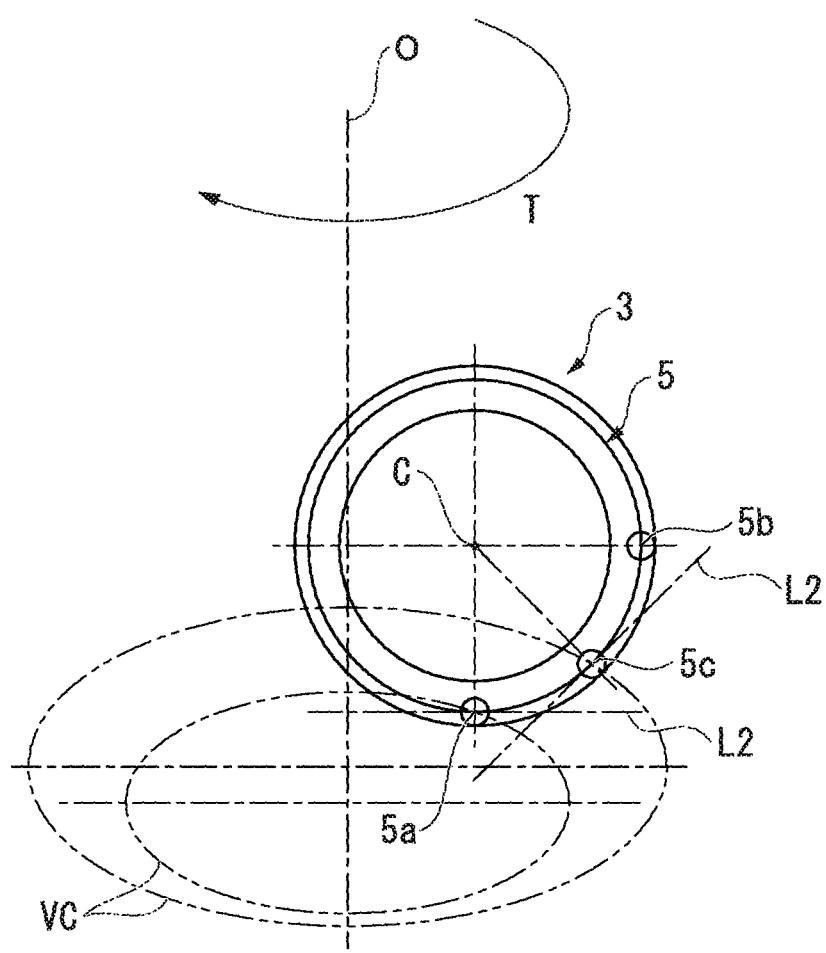
FIG. 16 is a front view of a front surface of a cutting insert in an insert axial line direction, which is viewed from the front, and a view showing a representative cutting point.

FIG. 15 shows a case in which the representative cutting point of the cutting insert 3 is set at the intermediate point 5*c*. When the representative cutting point is the intermediate point 5*c*, a virtual circle VC serving as the rotational locus formed when the intermediate point 5*c* is rotated around the tool axial line O is located closer to the tool posterior end direction than the virtual circle VC when the above-described representative cutting point is set at the tool distal end edge 5*a*, and a diameter thereof is greater than the virtual circle VC. In this case, the machined surface MS (the second virtual plane $VS_2$) serving as the virtual plane including the two straight lines such as the virtual straight line L1 (the tangent line L1 passing through the intermediate point 5*c* of the virtual circle VC) in the instantaneous cutting direction and the tangent line L2 which passes through the intermediate point 5*c* of the cutting edge 5 at the intermediate point 5*c* is an inclined surface which is not perpendicular or parallel to the tool axial line O.

The angle of inclination i of the cutting in FIG. 15 is the angle which is formed by the normal NL which is perpendicular to the tangent line L2 passing through the representative cutting point (the intermediate point 5*c* in FIG. 15) of the cutting edge 5 and the virtual straight line L1 (the tangent line L1) which extends in the instantaneous cutting direction of the representative cutting point on the machined surface MS (the second virtual plane $VS_2$). Note that the tangent line L1 in this case is a tangent line which passes through the intermediate point 5*c* of the virtual circle VC serving as the rotational locus formed when the intermediate point 5*c* serving as the representative cutting point of the cutting edge 5 is rotated around the tool axial line O.

When the representative cutting point of the cutting insert 3 is set at the tool outer diameter edge 5*b*, which is not particularly shown, the machined surface MS (the second virtual plane $VS_2$) is the virtual plane which is parallel to the tool axial line O, and the angle of inclination i of the cutting is the angle which is formed by the normal NL which is perpendicular to the tangent line L2 passing through the representative cutting point (the tool outer diameter edge 5*b*) of the cutting edge 5 and the virtual straight line L1 (the tangent line L1) which extends in the instantaneous cutting direction of the representative cutting point on the machined surface MS (the second virtual plane $VS_2$).

The inventors of the present invention found that the cutting insert 3 is stably and easily rotated in the driven manner when the angle of inclination i of the cutting is in a range of i≤−15 degrees or 15 degrees ≤i and satisfies the conditions of the present invention (in which the insert axial line C is substantially parallel to the direction of the resultant force F3 on the surface of the first virtual plane $VS_1$) on the basis of an experimental result, a simulation (an analysis), and the like.

Note that the expression "cutting insert 3 is stably rotated in the driven manner" described in this specification means that the cutting insert 3 continues to be even slightly rotated around the insert axial line C every time the cutting insert 3 cuts into the work material during the cutting operation.

Figure 17:
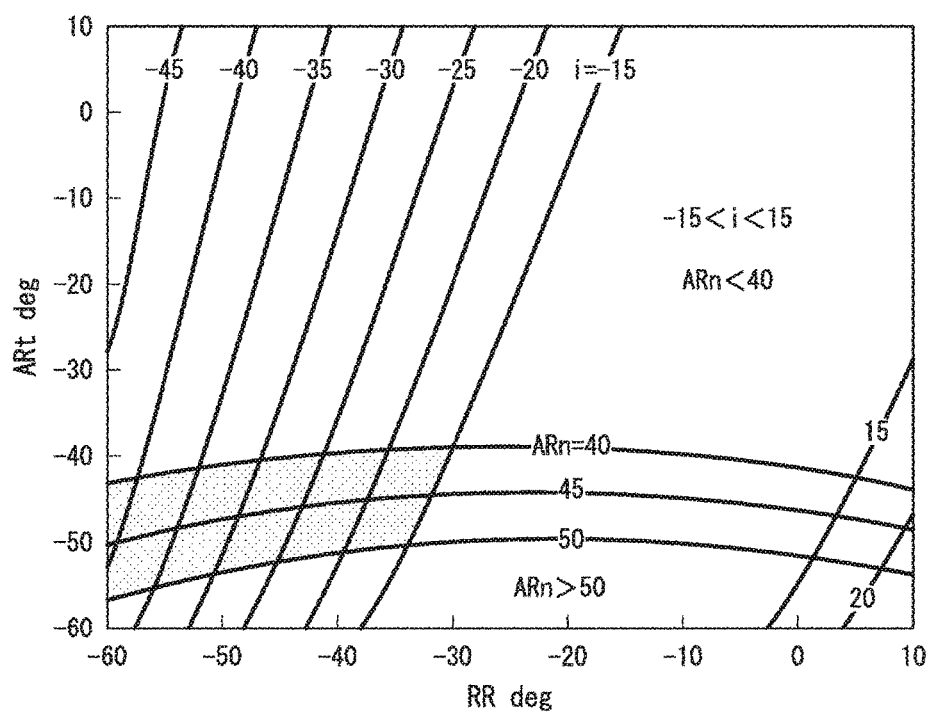
FIG. 17 is a graph in which an angle ARt and an angle RR, which are used to stably rotate the cutting insert of the rotating-cutting-edge-type milling tool of the first and second embodiments in a driven manner, are geometrically acquired and shows an example when a depth of cut da=0.5.

The graph shown in FIG. 17 is a range of appropriate combination of the angle ARt and the angle RR used to stably and easily rotate the cutting insert 3 in the driven manner in the rotating-cutting-edge-type milling tool which the predetermined representative cutting point (when the representative cutting point on the cutting edge 5 is set to the intermediate point 5*c*, and a depth of cut da in the tool axial line O direction of the tool main body 2 with respect to the work material is specifically da=0.5 mm) is set to, which is geometrically calculated on the basis of the above-described found facts.

The angle ARn shown in the graph corresponds to the angle θ (the angle which is set substantially parallel to the insert axial line C with respect to the direction of the resultant force F3) at which the insert axial line C is inclined with respect to the machined surface MS (the second virtual plane $VS_2$) and is 45 degrees±5 degrees in the illustrated example. Also, since the angle of inclination i of the cutting used to stably rotate the cutting insert 3 in the driven manner is in the range of i≤−15 degrees or 15 degrees ≤i, the ranges of the angles ARt and RR are determined by the combination thereof (a region in which the angle ranges overlap each other).

Figure 18:
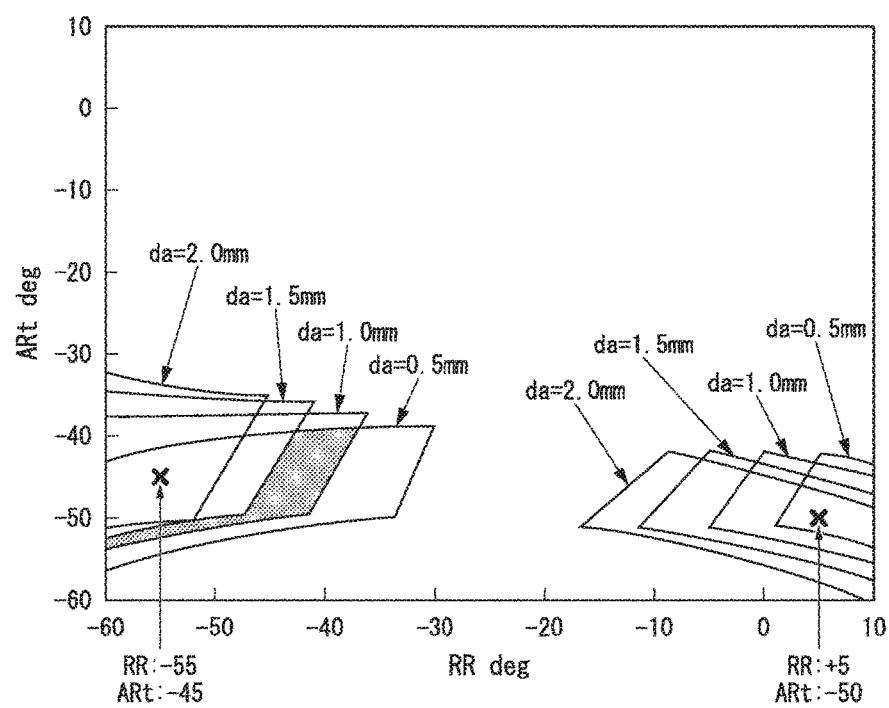
FIG. 18 is a graph showing ranges of an angle ARt and an angle RR which are appropriate for stably rotating the cutting insert in a driven manner in the rotating-cutting-edge-type milling tool related to the first and second embodiments of the present invention.
Figure 19:
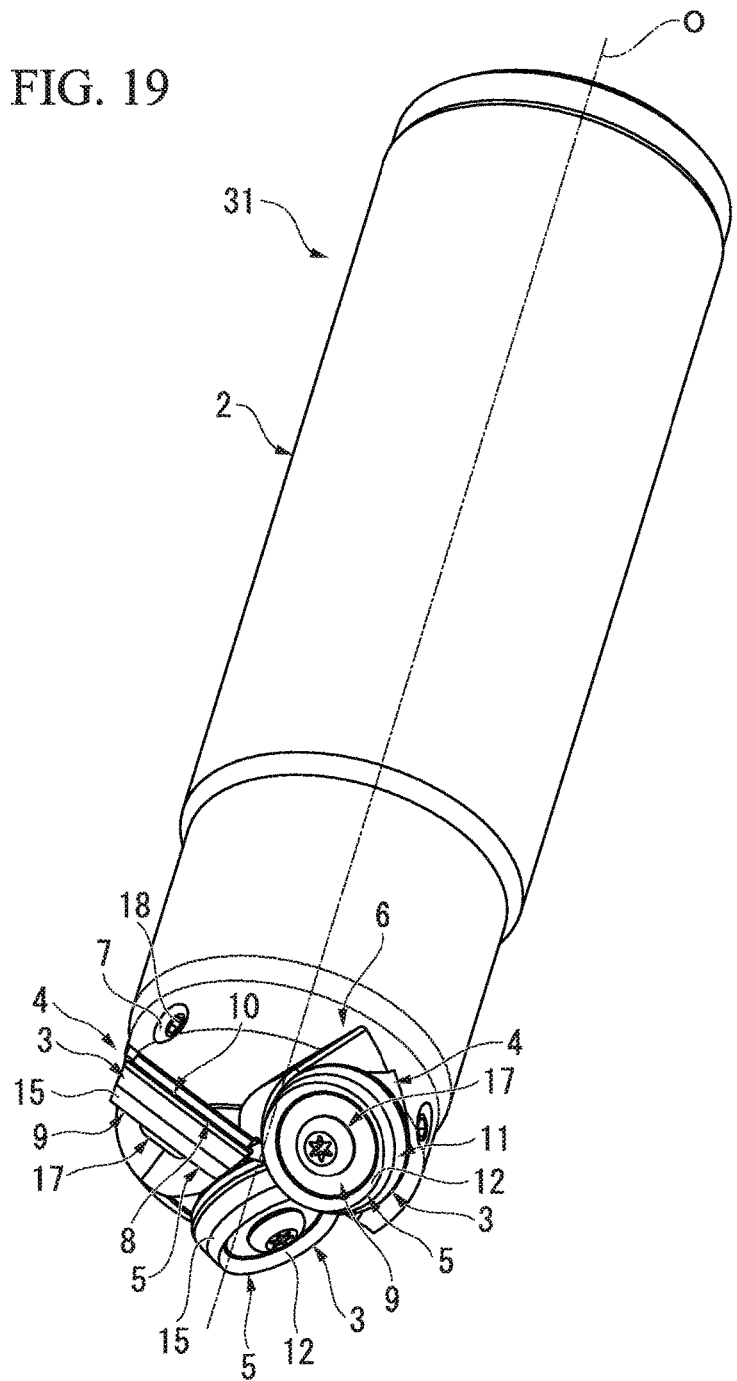
FIG. 19 is a perspective view showing the rotating-cutting-edge-type milling tool related to the second embodiment of the present invention.

FIG. 18 shows a graph in which the ranges of the angles ARt and RR when various representative cutting points are set in accordance with a depth of cut da on the basis of this concept are acquired.

The combination of the angle ARt: −45 degrees and the angle RR: −55 degrees, which is described in this embodiment, is in a range in which the cutting insert 3 is stably rotated in the driven manner irrespective of a magnitude of the depth of cut da (specifically, at at least da which is in a range of 0.5 to 2.0 mm).

In FIG. 6, a pair of circular surfaces including the attachment surface 4*a* of the insert attachment seat 4 on which the cutting insert 3 is mounted and the one circular surface (the attachment surface) 8*d* of the thrust sliding bearing member 8 both have planar shapes which are perpendicular to the insert axial line C. To be specific, an attachment surface of the insert attachment seat 4 has an axisymmetric geometry centering on the insert axial line C.

According to the rotating-cutting-edge-type milling tool 1 of this embodiment and the cutting method using the rotating-cutting-edge-type milling tool 1 which are described above, since the direction of the insert axial line C of the cutting insert 3 which is mounted on the insert attachment seat 4 of the tool main body 2 is set in parallel with the direction of the resultant force (a resultant cutting force) F3 of the principal force F1 and the back force F2 among the force received by the cutting edge 5 of the cutting insert 3 (which is the cutting force or the cutting resistance and includes the cutting edge force or the component of the edge force) when the cutting edge 5 cuts into the work material in the first virtual plane $VS_1$ which is perpendicular to the tangent line L2 of the cutting edge 5 passing through the representative cutting point. Therefore, a rotating shaft (a rotary support body) 17 which is on the insert axial line C of the cutting insert 3 is sufficiently suppressed from being pressed by the resultant force F3 in the insert radial direction (that is, in a shear direction of the rotating shaft 17), and the resultant force F3 can be sufficiently released to the insert attachment seat 4 via the rear surface 10 of the cutting insert 3. Thus, deformation, wear, damage, and the like of the rotating shaft 17 of the cutting insert 3 are prevented.

In other words, the inclination of the insert axial line C is determined in advance so as to be in parallel with the direction of the resultant force F3 acting on the representative cutting point on the cutting edge 5, which is determined in accordance with a desired cutting operation (a predetermined cutting condition and the like) using the rotating-cutting-edge-type milling tool 1, from the work material at the time of the cutting operation so that a load of the cutting insert 3 with respect to the rotating shaft 17 can be stably and significantly reduced.

Since the rotating shaft 17 of the cutting insert 3 is not easily pressed in the insert radial direction, the cutting insert 3 is stably rotated around the insert axial line C in the driven manner with respect to the insert attachment seat 4 by the force received by the cutting edge 5 when the cutting insert 3 cuts into the work material.

Note that the rotating shaft 17 is used as the rotary support body of the cutting insert 3 in this embodiment, but the present invention is not limited thereto. In addition, for example, a radial bearing (including a radial slide bearing), which rotatably supports the cutting insert 3 from the outside in the insert radial direction, may be used as the rotary support body. Even in this case, the radial bearing (the rotary support body) is suppressed from being pressed by the resultant force F3 in the insert radial direction, and deformation, wear, damage, occurrence of excessive friction torque, and the like of the radial bearing are prevented. Note that the expression "occurrence of excessive friction torque is prevented" means preventing a phenomenon in which friction torque is too large and thus the cutting insert 3 is not easily rotated when the cutting insert 3 is rotatably supported by the rotary support body such as the radial bearing from the outside in the insert radial direction as described above.

Note that, in the rotating-cutting-edge-type milling tool 1 of this embodiment and the cutting method using the rotating-cutting-edge-type milling tool 1, with regard to the feed force (the component of force which is directed in the direction of the tangent line L2 passing through the representative cutting point of the cutting edge 5 and the component of force which passes through the representative cutting point and is directed in the direction which is orthogonal to the first virtual plane $VS_1$) F4 other than the principal force F1 and the back force F2 in the force received by the cutting edge 5 when the cutting edge 5 cuts into the work material, since force, which plays a role in causing the cutting insert 3 to be rotated in the driven manner by roughly cancelling out the frictional force between the feed force F4 and the thrust sliding bearing member 8 (a rotating mechanism) and presses the rotating shaft 17 of the cutting insert 3, is sufficiently smaller than force other than the feed force F4, the force can be roughly neglected as force which presses the rotating shaft 17 of the cutting insert 3 in the insert radial direction, that is, a strong pressing force does not act on the rotating shaft 17 of the cutting insert 3 by the feed force F4. Thus, the insert axial line C extends in parallel with the direction of the resultant force F3 in the surface of the first virtual plane $VS_1$ so that the above-described effects can be stably acquired.

In the example of this embodiment, the representative cutting point is set at the tool distal end edge 5a on the cutting edge 5. For this reason, the insert axial line C extends to be gradually inclined toward the tool distal end (that is, inclined forward) as it goes forward in the tool rotation direction T. Thus, a space in which a rotating mechanism (the thrust sliding bearing member 8 of this embodiment) configured to rotate the cutting insert 3 in the driven manner is arranged in the insert attachment seat 4 can be easily secured. To be specific, the insert axial line C is inclined forward as described above so that, even if an interval between the adjacent insert attachment seats 4 in the tool circumferential direction tends to be narrow in the multi-blade rotating-cutting-edge-type milling tool 1, in which a plurality of cutting inserts 3 are mounted, the space in which the rotating mechanism is arranged can be easily secured as in this embodiment.

Note that, when the representative cutting point is set at the tool outer diameter edge 5b on the cutting edge 5, the insert axial line C extends to be gradually inclined outward in the tool radial direction as it goes forward in the tool rotation direction T. Also, when the representative cutting point is set at the intermediate point 5c, which is between the tool distal end edge 5a and the tool outer diameter edge 5b, on the cutting edge 5, the insert axial line C may extend to be gradually inclined toward the tool distal end and outward in the tool radial direction as it goes forward in the tool rotation direction T. Even in these cases, the space can also be easily secured between the insert attachment seats 4 in the tool circumferential direction.

As described above, according to this embodiment, deformation, wear, damage, and the like of the rotating shaft 17 or the like of the cutting insert 3 can be prevented, and the cutting insert 3 which is mounted on the insert attachment seat 4 can be stably rotated in the driven manner in the insert circumferential direction. Thus, the processing accuracy of the cutting is stably increased, and a tool life can thus be increased.

Also, in the rotating-cutting-edge-type milling tool 1 described in this embodiment, the representative cutting point of the cutting edge 5 of the cutting insert 3 is set at a predetermined position in the arc-shaped portion with the central angle of 90 degrees between the portion (the tool distal end edge 5a) located at the distal end in the tool axial line O direction and the portion (the tool outer diameter edge 5b) located at the outer end in the tool radial direction which is orthogonal to the tool axial line O, which is in the entire circumference of the cutting edge 5. Thus, the following effects are acquired.

In other words, for example, if the type of the cutting operation using the rotating-cutting-edge-type milling tool 1 is the "face milling process," the representative cutting point on the cutting edge 5 is close to the tool distal end edge 5a. Also, if the type of the cutting operation is the "shoulder milling process," the representative cutting point on the cutting edge 5 is close to the tool outer diameter edge 5b.

According to the above-described constitution of this embodiment, since the representative cutting point is set at a predetermined position of the arc-shaped portion with the central angle of 90 degrees (the arc of ¼ when the circumference of the cutting edge 5 is set to 1), which is between the tool distal end edge 5a and the tool outer diameter edge 5b, on the cutting edge 5, the present invention can be applied to the rotating-cutting-edge-type milling tool 1 used for, for example, the face milling process, the shoulder milling process, the combination process thereof (the R milling process), and the like.

Also, since the angle ARt is in a range of −30 degrees to −60 degrees and the angle RR is in a range of −30 degrees to −75 degrees in this embodiment, the cutting insert 3 is stably and easily rotated around the insert axial line C in the driven manner with respect to the insert attachment seat 4 by the force received by the cutting edge 5 when the cutting insert 3 cuts into the work material, and the above-described effects are significantly attained. To be specific, the angles ARt and RR of this embodiment are derived on the basis of the graph of FIG. 18.

Also, the cutting insert 3 is mounted on the insert attachment seat 4 to fall in the range of the angle ARt and the range of the angle RR which are described above so that it can be expected that the cutting insert 3 can be stably rotated in the driven manner, the wear and the like of the rake face 12 is significantly suppressed, and the life is further increased.

To be specific, when the angle ARt is out of the above-described range (is greater than −30 degrees or smaller than −60 degrees), there is a concern that it is difficult to maintain the direction of the insert axial line C and the direction of the resultant force F3 to be parallel to each other on the surface of the first virtual plane $VS_1$ and a load (a pressing force in the insert radial direction) of the cutting insert 3 on the rotating shaft (the rotary support body) 17 by the resultant force F3 is not easily suppressed, and thus the above-described effects cannot be stably and easily attained.

Also, when the angle RR is out of the above-described range, to be specific, when the angle RR is greater than −30 degrees (and is smaller than −20 degrees), there is a concern that an effect in which the cutting insert 3 can be stably rotated in the driven manner due to a combination of the angle RR and the angle ARt is not easily acquired. When the angle RR is smaller than −75 degrees, there is a concern that a cutting force at the time of the cutting operation is increased and chatter vibration is easily generated.

A portion of the front surface 9 of the cutting insert 3, which is close to an inside of the cutting edge 5 in the insert radial direction, is formed with the tapered rake face 12 which is gradually inclined toward the rear surface 10 from the front surface 9 in the insert axial line C direction as it goes inward in the insert radial direction from the cutting edge 5, and an angle α at which the rake face 12 is inclined with respect to the cutting edge virtual plane $VS_0$ is in a range of 35 degrees to 50 degrees when viewed in the longitudinal cross section including the insert axial line C of the cutting insert 3 in this embodiment. Thus, the following effects are acquired.

In other words, in an example of this embodiment, even if the insert axial line C extends to be gradually inclined toward the tool distal end in the tool axial line O direction as it goes forward in the tool rotation direction T and the cutting insert 3 is mounted on the insert attachment seat 4 in a mounting attitude in which the apparent axial rake angle (the angles ARt and ARn) is negative as described above, a substantially axial rake angle is set to be larger in a positive side than the apparent axial rake angle, and thus sharpness of the cutting edge 5 is stably increased and cutting edge loss and the like can also be prevented.

The insert axial line C may extend to be gradually inclined outward in the tool radial direction as it goes forward in the tool rotation direction T. In this case, the cutting insert 3 is mounted on the insert attachment seat 4 in the mounting attitude in which the radial rake angle (the angle RR) in external appearance is negative. However, a substantially radial rake angle is set to be larger in a positive side than the apparent radial rake angle, and the sharpness of the cutting edge 5 is also stably increased.

Even if the insert axial line C extends to be gradually inclined toward the tool distal end and outward in the tool radial direction as it goes forward in the tool rotation direction T, the same effects as described above are acquired.

To be specific, when the angle α is less than 35 degrees, there is a concern that the cutting edge is less likely to become sharp enough as the sharpness of the cutting edge 5 is sufficiently increased and thus processing accuracy cannot be secured. Also, when the angle α exceeds 50 degrees, there is a concern that the wedge angle γ is reduced and thus cutting edge loss and the like are generated.

The outer periphery surface 11 of the cutting insert 3 is formed with the tapered flank face 15 which is gradually inclined outward in the insert radial direction as it goes toward the rear surface 10 from the front surface 9 in the insert axial line C direction from the cutting edge 5, and the angle β at which the flank face 15 is inclined with respect to the insert axial line C is in a range of 10 degrees to 35 degrees when viewed in the longitudinal cross section including the insert axial line C of the cutting insert 3 in this embodiment. Thus, the following effects are acquired.

In other words, even if the cutting insert 3 is mounted on the insert attachment seat 4 in the above-described mounting attitude, the wedge angle γ of the cutting edge 5 can be significantly secured, and cutting edge loss and the like can be prevented.

To be specific, when the angle β is less than 10 degrees, it is difficult to sufficiently and significantly secure the wedge angle γ of the cutting edge 5, and thus an effect in which cutting edge loss and the like are prevented is not easily acquired. Also, when the angle β exceeds 35 degrees, there is a concern that a gap between the flank face 15 and a machined surface of the work material is narrow and thus machined surface quality cannot be secured due to chip biting and the like in the gap.

In this embodiment, the rotating shaft (the rotary support body) 17 configured to rotatably mount the cutting insert 3 on the insert attachment seat 4 is provided, and the restricting portion in which a position of the rotating shaft 17 with respect to the insert attachment seat 4 in the insert axial line C direction can be adjusted and movement of the rotating shaft 17 with respect to the insert attachment seat 4 in the insert axial line C direction can be restricted is provided. Thus, the following effects are acquired.

In other words, the cutting insert 3 is rotated with respect to the insert attachment seat 4 in the driven manner while being supported by the shaft portion 17a of the rotating shaft 17, which is inserted through in the through hole 14, from an inside in the insert radial direction, and is retained by the head portion 17b of the rotating shaft 17. Also, the position of the rotating shaft 17 with respect to the insert attachment seat 4 in the insert axial line C direction is adjusted so that a gap (a clearance) between the head portion 17b of the rotating shaft 17 and the front surface 9 of the cutting insert 3 can be set to a desired value, and the movement of the rotating shaft 17 with respect to the insert attachment seat 4 in the insert axial line C direction can be restricted by the restricting portion after the adjustment.

According to this constitution, for example, when the rotating mechanism such as the thrust sliding bearing member 8 by which the cutting insert 3 can be rotated on the insert attachment seat 4 in the driven manner is provided as in this embodiment, the rotating shaft 17 can be fixed after a position is minutely adjusted by advancing or retreating the rotating shaft 17 in the insert axial line C direction in accordance with a wear (wear and loss) state of the rotating mechanism, and thus the rotation of the cutting insert 3 in the driven manner with respect to the insert attachment seat 4 is more stably maintained.

According to this constitution, for example, even if a variation according to a product is generated in an external profile height (a distance between the front and rear surfaces 9 and 10) of the cutting insert 3 in the insert axial line C direction, an advancing or retreating position (an amount of screwing) of the rotating shaft 17 with respect to the insert attachment seat 4 is adjusted in accordance with the external profile height of each of the cutting inserts 3 so that the generated variation can be easily coped with.

Note that, to be specific, for example, first, the shaft portion 17a of the rotating shaft 17, which is inserted through the cutting insert 3, is screwed into (is screw-tightened into) the rotary shaft mounting hole 4c to adjust a position of the rotating shaft 17 in an axial line direction, and the screwing of the rotating shaft 17 is returned (is screw-loosened) by a predetermined number of rotation (or a predetermined rotational angle) from a state in which the head portion 17b comes into contact with the front surface 9 of the cutting insert 3 so that a predetermined amount of clearance is provided between the head portion 17b and the front surface 9. In this state, the rotating shaft 17 may be fixed by the restricting portion (the screw hole 7 and the set screw 18).

Since the attachment surface (the circular surface 8d of the thrust sliding bearing member 8 or the attachment surface 4a), on which the rear surface 10 of the cutting insert 3 sits, has an axisymmetric geometry having the insert axial line C as a center (a central axial line), the entire attachment surface of the insert attachment seat 4 can receive the resultant force F3, which is transferred to the insert attachment seat 4 from the cutting insert 3, in a distributed manner, and local wear and the like on the attachment surface is prevented. Thus, the above-described effects are stably acquired over a long period of time.

Note that a conical surface shape, a spherical shape, or a combined shape of the shapes having the insert axial line C as a central axial line may be formed instead of the attachment surface which is formed in a planar shape. Even in this case, the same effects as described above are attained. To be specific, for example, when the attachment surface of the insert attachment seat 4 has a concave conical surface shape (or a convex conical surface shape), the rear surface 10 of the cutting insert 3 is formed in a convex conical surface shape (or a concave conical surface shape) having the insert axial line C as a central axial line.

(Second Embodiment)

Next, a rotating-cutting-edge-type milling tool 31 and a cutting method using the rotating-cutting-edge-type milling tool 31 related to a second embodiment of the present invention will be described with reference to the drawings.

Note that the same constitutions as those of the above-described embodiment are denoted with the same names or the reference numerals, and the descriptions thereof will be omitted.

As shown in FIGS. 19 to 24, in the rotating-cutting-edge-type milling tool 31 of this embodiment, a mounting attitude (in particular, an angle RR) of a cutting insert 3 with respect to an insert attachment seat 4 is different from that of the above-described embodiment.

Figure 22:
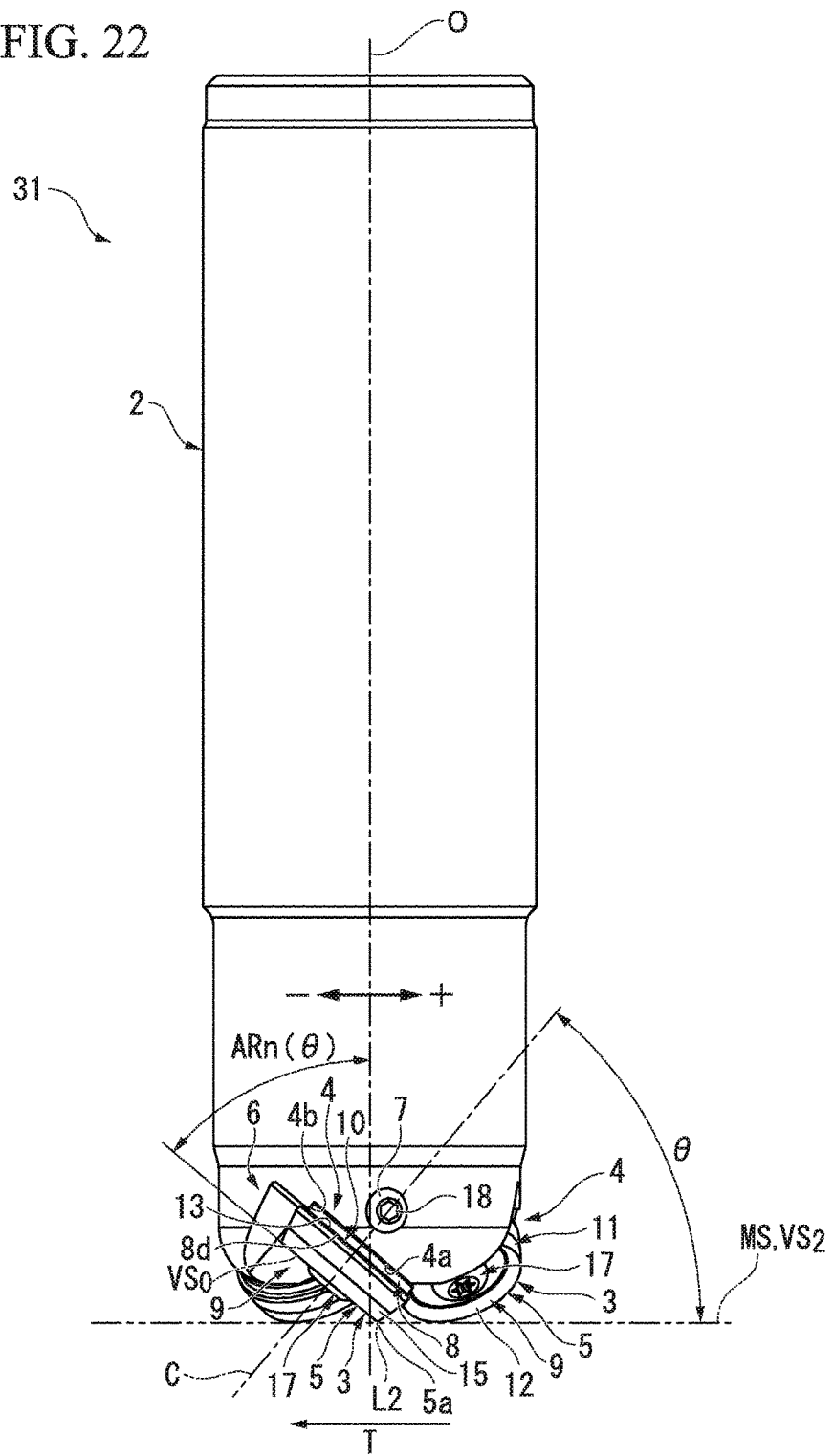
FIG. 22 is a side view of the rotating-cutting-edge-type milling tool of FIG. 20, which is viewed in a direction of a tangent line which passes through a tool distal end edge (a representative cutting point) of a cutting edge of a cutting insert.
Figure 23:
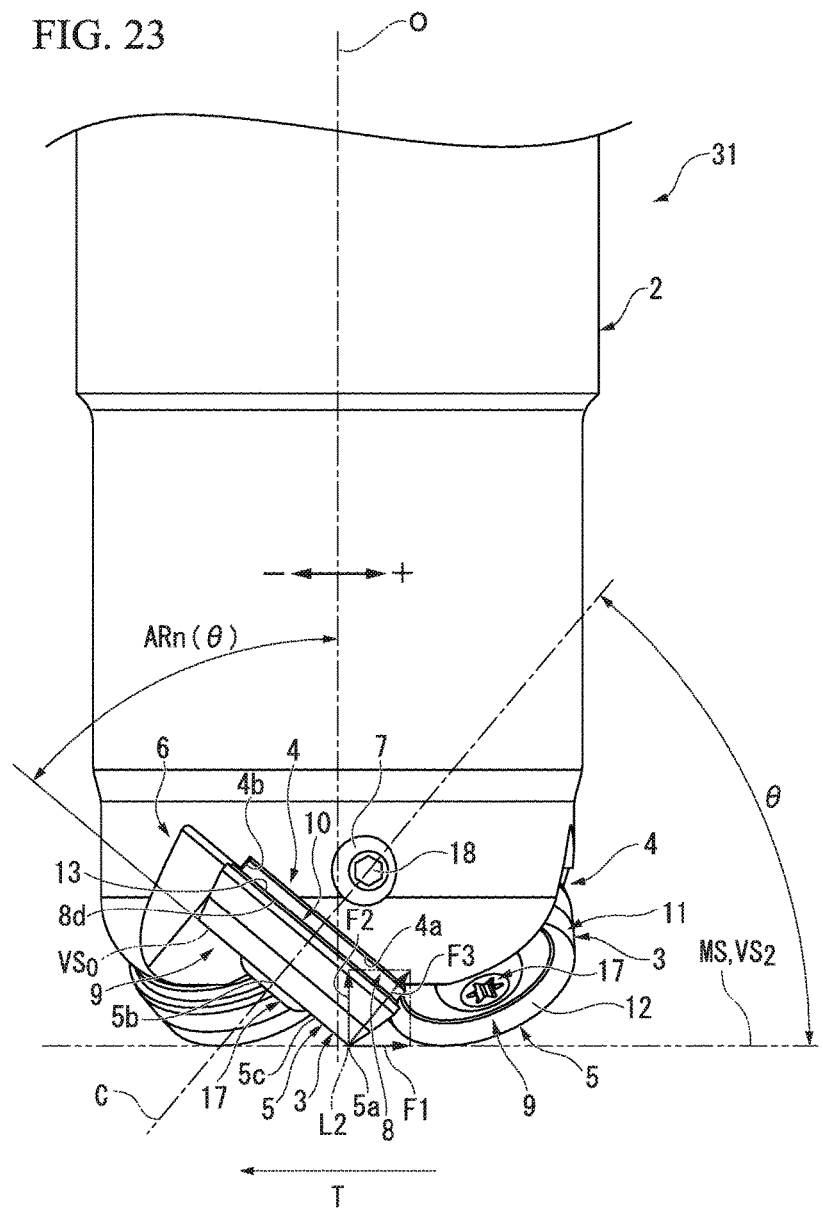
FIG. 23 is an enlarged view of a main portion of FIG. 22.

To be specific, even in the second embodiment, as shown in FIGS. 22 and 23, an insert axial line C of the cutting insert 3 extends to be gradually inclined toward a tool distal end as it goes forward in a tool rotation direction T in a state in which the cutting insert 3 is mounted on the insert attachment seat 4. Here, the present invention is not limited thereto. The insert axial line C of the cutting insert 3 may extend to be gradually inclined outward in a tool radial direction as it goes forward in the tool rotation direction T. Alternatively, the insert axial line C of the cutting insert 3 may extend to be gradually inclined forward in the tool rotation direction T and outward in the tool radial direction as it goes forward in the tool rotation direction T. Even in this embodiment, an inclined direction of the insert axial line C is determined by providing the following representative cutting point. However, the inclined direction of the insert axial line C is not uniquely determined by determining the representative cutting point as in the above-described embodiment, but is determined even in consideration of, for example, an inclined direction, in which the cutting insert 3 is more easily rotated in a driven manner, and the like.

Figure 20:
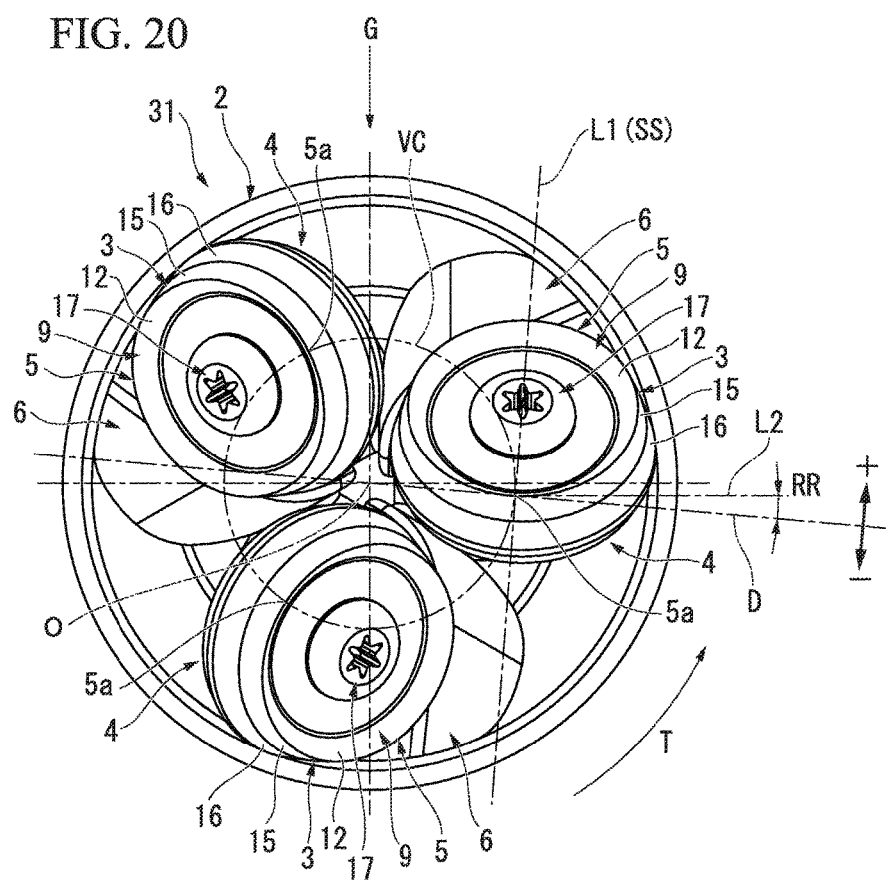
FIG. 20 is a front view showing the rotating-cutting-edge-type milling tool related to the second embodiment of the present invention (a view when a tip surface of the rotating-cutting-edge-type milling tool in a tool axial line direction is viewed from the front).
Figure 21:
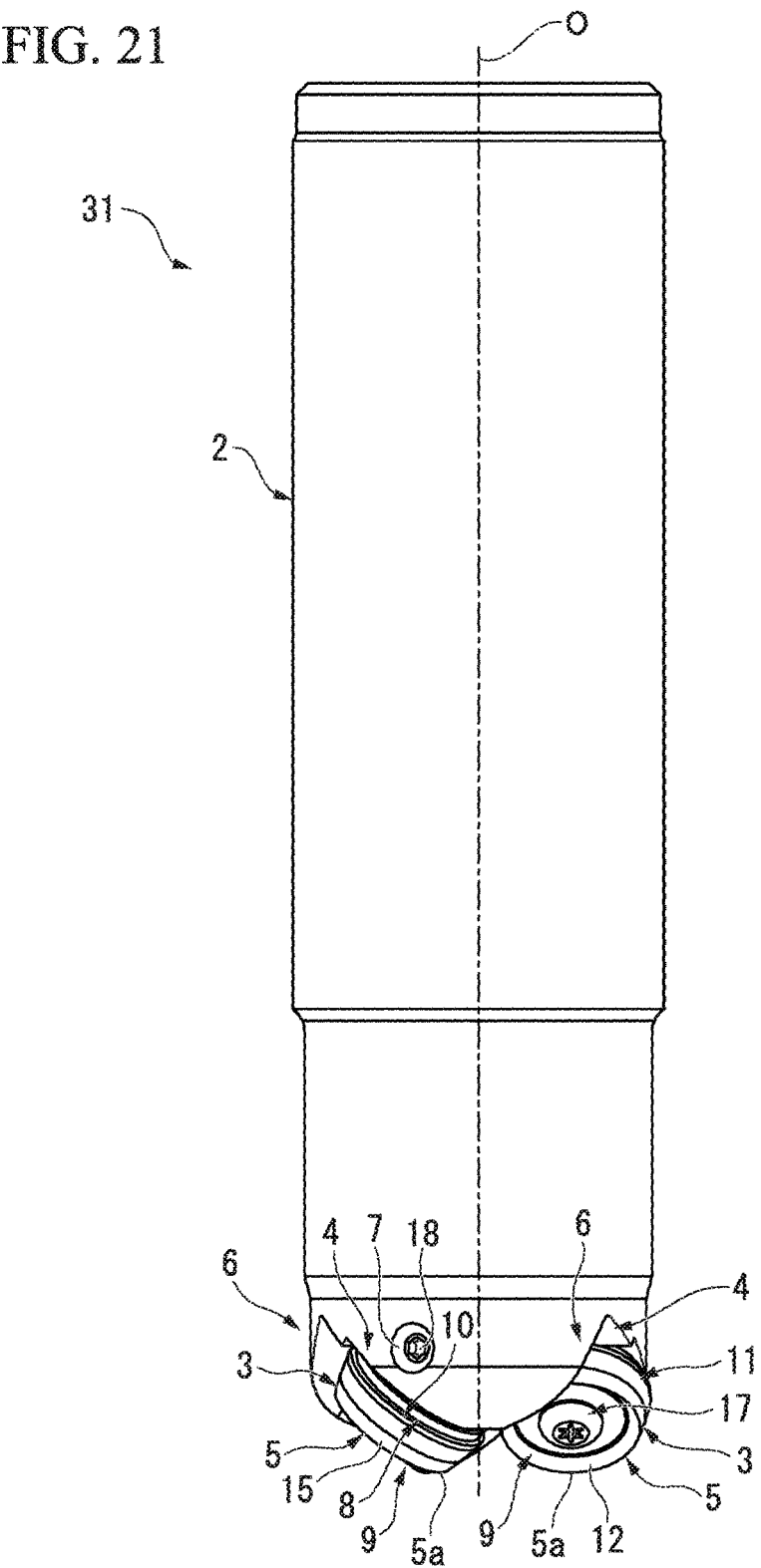
FIG. 21 is a side view showing an arrow G view of the rotating-cutting-edge-type milling tool of FIG. 20.

As shown in FIGS. 12, 20, and 23, when it is assumed that, among insert radial directions which are orthogonal to the insert axial line C, a point of intersection between a predetermined insert radial direction ID passing through a point of action P of a concentrated load when force, which acts on the cutting insert 3 from a work material in a distributed manner at a time of a cutting operation, is regarded as the concentrated load (when the force is similar to the concentrated load) and a cutting edge 5 is a representative cutting point. A direction which is directed in a line of intersection L of a first virtual plane $VS_1$ which is perpendicular to a tangent line L2 of the cutting edge 5 passing through the representative cutting point and a second virtual plane $VS_2$ which includes the tangent line L2 and a virtual straight line L1 in an instantaneous cutting direction at the representative cutting point, in which the direction (a right direction of FIG. 23) is directed rearward in the tool rotation direction T, is a principal force direction. Among force which are received by the cutting insert 3 from the work material at the time of the cutting operation, a component of force at the representative cutting point (reference numeral 5a in FIG. 23) in the principal force direction is a principal force F1 and a component of force which is perpendicular to the principal force direction and which is directed in a back force direction (an upper direction of FIG. 23), which is directed inward in the insert radial direction, is a back force F2. An extending direction of the insert axial line C is set parallel or to have a predetermined minute angle to a direction of a resultant force F3 of the principal force F1 and the back force F2 on the surface of the first virtual plane $VS_1$.

Note that, although not particularly shown, in this embodiment, among force (which is the cutting force or the cutting resistance and includes the cutting edge force or the component of edge force) received by the cutting edge 5 when the cutting edge 5 cuts into the work material, a feed force F4 serving as a component of force (that is, a component of force which passes through the representative cutting point, and a direction of which is orthogonal to the first virtual plane $VS_1$) directed in a direction of the tangent line L2 which passes through the representative cutting point of the cutting edge 5 is set inward in the tool radial direction.

Note that, even in this embodiment, the representative cutting point is set at a tool distal end edge 5a as in the above-described embodiment, but the representative cutting point is set at a predetermined position in an arc-shaped portion with a central angle of 90 degrees (an arc of ¼ when a circumference of the cutting edge 5 is set to 1) between a portion (a tool distal end edge 5a) located at a distal end in a tool axial line O direction and a portion (a tool outer diameter edge 5b) located at an outer end in the tool radial direction, which is in an entire circumference of the cutting edge 5 of the cutting insert 3 mounted on the tool main body 2.

In FIG. 20, if a circle obtained by a locus when the tool distal end edge 5a (the representative cutting point) on the cutting edge 5, is rotated the tool circumferential direction, is set as a virtual circle VC. A virtual plane obtained by a locus when a tangent line L1 (a virtual straight line in an instantaneous cutting direction) of the virtual circle VC which passes through the tool distal end edge 5a, is moved parallel to the tool axial line O in the direction toward the tool posterior end, is set as a reference plane SS. An angle ARt at which a cross line CL (although not particularly shown in this embodiment, refer to FIGS. 5 and 6 of the above-described embodiment) of the reference plane SS and a cutting edge virtual plane $VS_0$ including the circular cutting edge 5 is inclined with respect to the tool axial line O projected onto the reference plane SS is in a range of, for example, −30 degrees to −60 degrees. In other words, the above-described angle ARt is an axial rake angle in which the instantaneous cutting direction in the tool distal end edge 5a of the cutting edge 5 used for cutting is considered, and is specifically a negative axial rake angle.

Note that, in this embodiment, the angle ARt is set to 50 degrees of negative (−50 degrees).

On the other hand, as shown in FIGS. 22 and 23, an angle ARn at which the cutting edge virtual plane $VS_0$ is inclined with respect to the tool axial line O is in a range of, for example, −30 degrees to −50 degrees when viewed in the tool radial direction which is perpendicular to the cutting edge virtual plane $VS_0$. In other words, the angle ARn is an axial rake angle in which the instantaneous cutting direction of the cutting insert 3 alone which is mounted on the tool main body 2 is not considered, and the negative axial rake angle.

In FIG. 20, an angle RR at which a cutting edge tangent line L2 of the cutting edge 5, which passes through the tool distal end edge 5a and extends outward in the tool radial direction, is inclined with respect to a predetermined tool radial direction D, among the tool radial directions which passes through the tool distal end edge 5a, is in a range of, for example, −20 degrees to 30 degrees. In other words, the angle RR is a radial rake angle at the tool distal end edge 5a of the cutting edge 5 used for cutting. In this embodiment, the angle RR is 5 degrees of positive (+5 degrees). As shown in FIG. 20, in a front view when the rotating-cutting-edge-type milling tool 31 is viewed toward the posterior end from the distal end in the tool axial line O direction, when the angle RR is +(plus), the cutting edge tangent line L2 gradually extends rearward in the tool rotation direction T as it goes outward in the tool radial direction from the tool distal end edge 5a. In FIG. 20, a predetermined tool radial direction D coincides with a reference surface in which the angle RR (the radial rake angle)=0 degree.

Figure 24:
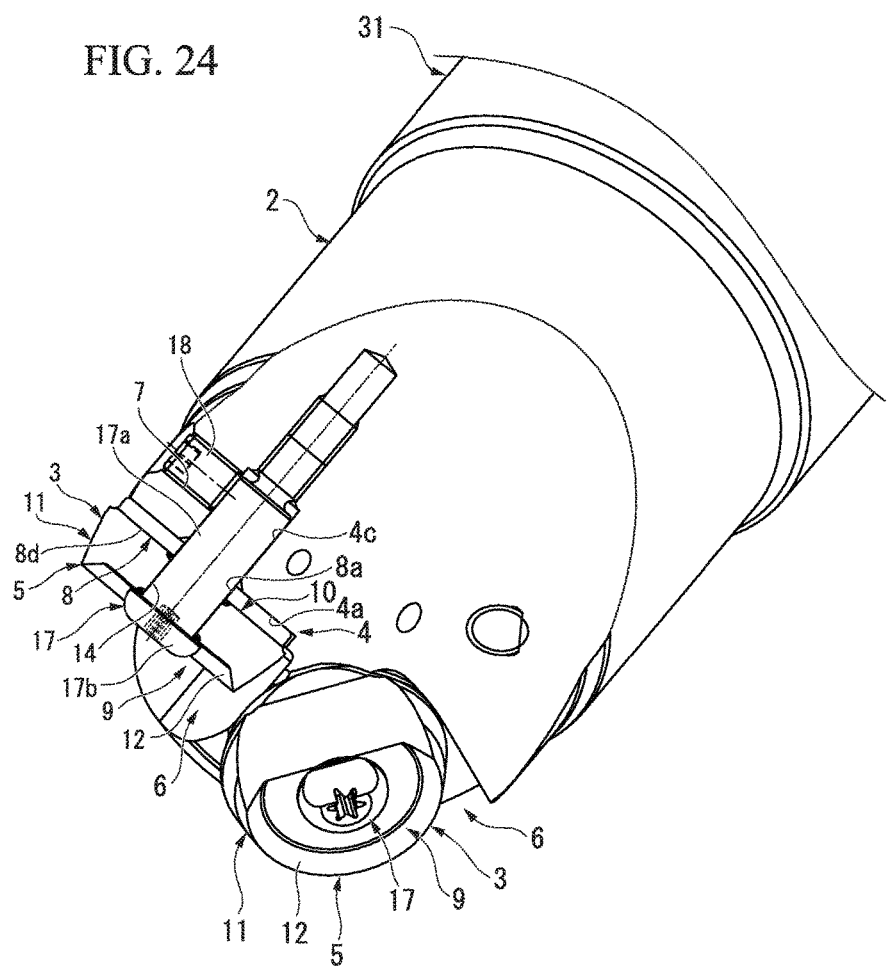
FIG. 24 is a partial cross-sectional view showing a clamping mechanism of the cutting insert of the rotating-cutting-edge-type milling tool related to the second embodiment.

In FIGS. 23 and 24, a pair of circular surfaces including an attachment surface 4a of the insert attachment seat 4, on which the cutting insert 3 is mounted, and one circular surface (an attachment surface) 8d of a thrust sliding bearing member 8 are both planar shapes which are perpendicular to the insert axial line C, and the attachment surface of the insert attachment seat 4 specifically has an axisymmetric geometry having the insert axial line C as a center (a central axial line).

Also, an angle θ which is formed between the insert axial line C of the cutting insert 3 and a machined surface MS (the second virtual plane $VS_2$) is in a range of, for example, 20 degrees to 70 degrees when a direction of the tangent line L2 passing through the representative cutting point (the tool distal end edge 5a) of the cutting edge 5 shown in FIG. 23.

Even in the rotating-cutting-edge-type milling tool 31 of the second embodiment and the cutting method using the rotating-cutting-edge-type milling tool 31 which are described above, since a direction of the insert axial line C of the cutting insert 3 which is mounted on the insert attachment seat 4 of the tool main body 2 is set in parallel with a direction of the resultant force (a resultant cutting force) F3 of the principal force F1 and the back force F2 among force received by the cutting edge 5 of the cutting insert 3 (which is the cutting force or the cutting resistance and includes the cutting edge force or the component of edge force) when the cutting edge 5 cuts into the work material in the first virtual plane $VS_1$ which is perpendicular to the tangent line L2 of the cutting edge 5 passing through the representative cutting point, the same effects as the above-described first embodiment are acquired.

Since the angle ARt is in a range of −30 degrees to −60 degrees and the angle RR is in a range of −20 degrees to 30 degrees in this embodiment, the cutting insert 3 is more stably and easily rotated around the insert axial line C in the driven manner with respect to the insert attachment seat 4 by the force received by the cutting edge 5 when the cutting insert 3 cuts into the work material, the above-described effects are more significantly attained.

Here, in the graph shown in FIG. 18, the combination of the angle ARt: −50 degrees and the angle RR: +5 degrees, which is described in this embodiment, is in a range in which the cutting insert 3 is stably rotated in the driven manner irrespective of a magnitude of the depth of cut da (specifically, at at least da which is in a range of 0.5 to 2.0 mm).

The cutting insert 3 is mounted on the insert attachment seat 4 such that the angle ARt is in the range of the above-described range and the angle RR is in the above-described range. Thus, the cutting insert 3 is stably rotated in the driven manner, wear and the like of the rake face 12 are significantly suppressed, and thus an effect in which a tool life is further improved can be expected.

To be specific, when the angle ARt is out of the above-described range (is greater than −30 degrees or smaller than −60 degrees), it is difficult to maintain the direction of the insert axial line C and the direction of the resultant force F3 to be parallel to each other on the surface of the first virtual plane $VS_1$ and a load (a pressing force in the insert radial direction) of the cutting insert 3 with respect to the rotating shaft (the rotary support body) 17 by the resultant force F3 is not easily suppressed, and thus there is a concern that the above-described effects cannot be stably and easily attained.

Also, when the angle RR is smaller than −20 degrees (and is greater than −30 degrees), there is a concern that an effect in which the cutting insert 3 is stably rotated in the driven manner due to a combination of the angle RR and the angle ARt is not easily acquired. When the angle RR is greater than 30 degrees, there is a concern that chatter vibration is easily generated or an outer periphery surface 11 (a flank face 15) of the cutting insert 3 interferes with the work material at the time of the cutting operation, and thus an amount of movement (that is, feed per revolution fz) of the tool main body 2 per unit rotation about the tool axial line O in the tool radial direction is not easily secured. Note that, when a clearance angle of the outer periphery surface 11 of the cutting insert 3 is increased for the purpose of securing the feed per revolution fz, there is a concern that it is difficult to sufficiently secure a wedge angle γ of the cutting edge 5, and cutting edge loss and the like are thus generated.

Note that the present invention is not limited to the above-mentioned embodiments and includes various modified examples of the above-described embodiments within a range not departing from the gist of the present invention.

For example, in the above-described embodiments, a combination of numerical value ranges of the angle ARt serving as the axial rake angle and the angle RR serving as the radial rake angle is defined and described, but the present invention is not limited thereto.

In other words, in the present invention, the extending direction of the insert axial line C may be substantially parallel to the direction of the resultant force F3 on the surface of the first virtual plane $VS_1$ (when viewed in the direction of the tangent line L2 which passes through the representative cutting point on the cutting edge 5), and an action in which the cutting insert 3 is satisfactorily and easily rotated in the driven manner at the time of the cutting operation is acquired only with such a constitution. Also, the cutting insert 3 can be more reliably and stably rotated in the driven manner using the above-described combination of the angle ARt and the angle RR.

Also, in the above-described embodiments, a unit including a rotating shaft 17 which is inserted through a through hole 14 of the cutting insert 3 and is screwed into the rotary shaft mounting hole 4c of the insert attachment seat 4 to be able to be advanced or retreated in an insert axial line C direction and a restricting portion (a screw hole 7 and a set screw 18) which restricts advancing or retreating movement of the rotating shaft 17 in the insert axial line C direction is exemplified as a clamping mechanism of a cutting insert configured to rotatably mount the cutting insert 3 on the insert attachment seat 4 in the insert circumferential direction, but the present invention is not limited thereto.

In other words, for example, the cutting insert 3 may be rotatably supported about an axial line by the insert attachment seat 4 using a unit configured such that a cylindrical spacer which is inserted through in the through hole 14 of the cutting insert 3 is provided, a first end of the spacer comes into contact with the insert attachment seat 4, a shaft portion 17a of the rotating shaft 17 is inserted through the spacer and is screwed into the rotary shaft mounting hole 4c, and a head portion 17b of the rotating shaft 17 comes into contact with a second end of the spacer so that a predetermined clearance (a gap) is provided between the head portion 17b of the rotating shaft 17 and the front surface 9 of the cutting insert 3, as a clamping mechanism of a cutting insert which is different from the above-described clamping mechanism of the cutting insert.

In the above-described embodiments, the representative cutting point of the cutting edge 5 in the cutting insert 3 which is mounted in the rotating-cutting-edge-type milling tool 1 is set at a predetermined at an arc-shaped portion with a central angle of 90 degrees between the tool distal end edge 5a and the tool outer diameter edge 5b in the entire circumference of the cutting edge 5, but the present invention is not limited thereto. In other words, the representative cutting point may be located and set to an outer side in an extending direction of the arc than an end portion of an arc of the arc-shaped portion with the central angle of 90 degrees on the cutting edge 5. In this case, the central angle of the arc-shaped portion is greater than 90 degrees.

In addition, component elements which are described in the above-described embodiments, modified examples, and provision, and the like may be combined, and addition, omission, replacement, and other changes of components are possible within a range not departing from the gist of the present invention within a range not departing from the gist of the present invention. The present invention is not limited by the above description, and is only limited by the appended claims.

REFERENCE SIGNS LIST 1, 31 Rotating-cutting-edge-type milling tool
2 Tool main body
3 Cutting insert
4 Insert attachment seat
4a Attachment surface
5 Cutting edge
5a Tool distal end edge (representative cutting point) on cutting edge
5b Tool outer diameter edge (representative cutting point) on cutting edge
5c Intermediate point (representative cutting point), which is between tool distal end edge and tool outer diameter edge, on cutting edge
7 Screw hole (restricting portion)
8d One circular surface (attachment surface)
9 Front surface
10 Rear surface
11 Outer periphery surface
12 Rake face
14 Through hole
15 Flank face
17 Rotating shaft (rotary support body)
17a Shaft portion
17b Head portion
18 Set screw (restricting portion)
ARn Angle (axial rake angle)
ARt Angle (axial rake angle)
C Insert axial line
CL Cross line
D Predetermined tool radial direction
F1 Principal force
F2 Back force
F3 Resultant force
ID Predetermined insert radial direction
L Line of intersection
L1 Tangent line (virtual straight line in instantaneous cutting direction at representative cutting point)
L2 Cutting edge tangent line (tangent line passing through representative cutting point of cutting edge)
O Tool axial line
P Point of action
RR Angle (radial rake angle)
SS Reference plane
T Tool rotation direction
VC Virtual circle
$VS_0$ Cutting edge virtual plane
$VS_1$ First virtual plane
$VS_2$ Second virtual plane

What is claimed is:
1. A rotating-cutting-edge-type milling tool comprising:
a tool main body which is rotated around a tool axial line;
an insert attachment seat formed at an outer periphery portion of a distal end of the tool main body; and a cutting insert formed in a discoid shape is rotatable on a shaft around an insert axial line thereof, the shaft mounted on the insert attachment seat, the cutting insert including:
front and rear surfaces which intersect the insert axial line;
an outer periphery surface which connects circumferential edges of the front and rear surfaces; and
a cutting edge formed in a circular shape extending around the insert axial line, which is formed on a circumferential edge of the front surface, wherein
among the front and rear surfaces, the front surface is located to face forward in a tool rotation direction of the tool main body around the tool axial line, and the rear surface is located to face rearward in the tool rotation direction and sits on the insert attachment seat,
a virtual circle is obtained by a locus of a tool distal end edge of the cutting edge in a direction of the tool axial line when the tool distal end edge is rotated in a tool circumferential direction of the tool main body around the tool axial line,
a virtual plane as a reference plane is obtained by a locus of a tangent line of the virtual circle, which passes through the tool distal end edge, when the tangent line is moved parallel to the tool axial line toward a tool posterior end of the tool main body from the tool distal end edge,
an angle (ARt) at which a cross line of the reference plane and a cutting edge virtual plane including the cutting edge, is inclined with respect to the tool axial line projected onto the reference plane, is in a range of −30 degrees to −60 degrees,
an angle (RR) at which a cutting edge tangent line of the cutting edge which passes through the tool distal end edge and extends outward, is inclined with respect to a predetermined tool radial direction orthogonal to the tool axial line, which passes through the tool distal end edge and extends outward, is in a range of −30 degrees to −75 degrees or is in a range of −20 degrees to 30 degrees, and
the ranges of the angle (ARt) and the angle (RR) cause the insert axial line and a direction of a resultant force on the insert to be substantially parallel to each other during a cutting operation.

2. The rotating-cutting-edge-type milling tool according to claim 1, wherein
a portion on the front surface of the cutting insert, which is close to an inside of the cutting edge in an insert radial direction which is orthogonal to the insert axial line, is provided with a rake face formed in a tapered shape which is gradually inclined toward the rear surface from the front surface in the insert axial line direction as it goes inward in the insert radial direction from the cutting edge.

3. The rotating-cutting-edge-type milling tool according to claim 1, wherein
the outer periphery surface of the cutting insert is provided with a flank face formed in a tapered shape which is gradually inclined outward in an insert radial direction which is orthogonal to the insert axial line as it goes toward the rear surface from the front surface in the insert axial line direction from the cutting edge.

4. The rotating-cutting-edge-type milling tool according to claim 1, wherein
the cutting insert is provided with a through hole which extends on the insert axial line and is open to the front and rear surfaces,
a rotating shaft is provided at the insert attachment seat, the rotating shaft including:
a shaft potion, a diameter of which is smaller than that of the through hole, which is inserted through in the through hole, and which is attached to the insert attachment seat; and
a head potion, a diameter of which is larger than that of the through hole and which has a gap between the head potion and the front surface, wherein
a position of the rotating shaft with respect to the insert attachment seat in the insert axial line direction is able to be adjusted, and
a restricting potion which is able to restrict movement of the rotating shaft with respect to the insert attachment seat in the insert axial line direction is provided.

5. The rotating-cutting-edge-type milling tool according to claim 1, wherein
the insert attachment seat includes an attachment surface having an axisymmetric geometry centering on the insert axial line.

6. The rotating-cutting-edge-type milling tool according to claim 1, wherein,
when the angle (ARt) is negative, the cross line gradually extends forward in the tool rotation direction as it goes toward the tool posterior end from the tool distal end edge, when the angle (ARt) is positive, the cross line gradually extends rearward in the tool rotation direction as it goes toward the tool posterior end from the tool distal end edge, and wherein,
when the angle (RR) is negative, the cutting edge tangent line gradually extends rearward in the tool rotation direction as it goes outward in the tool radial direction from the tool distal end edge, when the angle RR is positive, the cutting edge tangent line gradually extends forward in the tool rotation direction as it goes outward in the tool radial direction from the tool distal end edge.

7. A cutting method of cutting a work material using the rotating-cutting-edge-type milling tool of claim 1,
wherein when it is assumed that, a point of intersection of a predetermined insert radial direction among insert radial directions which are orthogonal to the insert axial line, passing through a point of action of a concentrated load when force, which acts on the cutting insert from the work material in a distributed manner at a time of a cutting operation, is regarded as a concentrated load and the cutting edge, is a representative cutting point,
a direction which is directed in a line of intersection of a first virtual plane which is perpendicular to a tangent line of the cutting edge passing through the representative cutting point and a second virtual plane which includes the tangent line and a virtual straight line in an instantaneous cutting direction at the representative cutting point, in which the direction is directed rearward in the tool rotation direction, is a principal force direction,
among force which acts on the cutting insert from the work material at the time of the cutting operation, a component of force at the representative cutting point in the principal force direction is a principal force, and a component of force which is perpendicular to the principal force direction and is directed in a back force direction, which is directed inward in the insert radial direction, is a back force, and
an angle at which the insert axial line is inclined with respect to a direction of a resultant force of the principal force and the back force on a surface of the first virtual plane is set in a range of ±20 degrees.

8. The cutting method using the rotating-cutting-edge-type milling tool according to claim 7, wherein
the angle at which the insert axial line is inclined with respect to the direction of the resultant force is set in a range of ±10 degrees.

9. The cutting method using the rotating-cutting-edge-type milling tool according to claim 7, wherein
the angle at which the insert axial line is inclined with respect to the direction of the resultant force is set in a range of ±5 degrees.

* * * * *